(12) United States Patent
Fujita et al.

(10) Patent No.: US 9,946,119 B2
(45) Date of Patent: Apr. 17, 2018

(54) DISPLAY DEVICE AND MANUFACTURING METHOD THEREOF

(71) Applicant: NLT TECHNOLOGIES, LTD., Kanagawa (JP)

(72) Inventors: Akira Fujita, Kanagawa (JP); Futoshi Nakanishi, Kanagawa (JP); Hitoshi Yoshida, Kanagawa (JP); Akira Suzuki, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 0 days.

(21) Appl. No.: 15/060,847

(22) Filed: Mar. 4, 2016

(65) Prior Publication Data
US 2016/0262273 A1 Sep. 8, 2016

(30) Foreign Application Priority Data
Mar. 6, 2015 (JP) .................................. 2015-045078

(51) Int. Cl.
| | |
|---|---|
| *H05K 5/00* | (2006.01) |
| *H05K 9/00* | (2006.01) |
| *G02F 1/1341* | (2006.01) |
| *G06F 1/16* | (2006.01) |

(52) U.S. Cl.
CPC .......... *G02F 1/1341* (2013.01); *G06F 1/1601* (2013.01); *G06F 1/1637* (2013.01); *G06F 2200/1612* (2013.01)

(58) Field of Classification Search
CPC .................................. G06F 1/18; G02F 1/1341
USPC .......................................................... 361/818
See application file for complete search history.

(56) References Cited

U.S. PATENT DOCUMENTS

| | | | | |
|---|---|---|---|---|
| 7,966,785 | B2 * | 6/2011 | Zadesky | B32B 17/10018 239/362 |
| 8,243,225 | B2 * | 8/2012 | Kai | G06F 3/0414 349/12 |
| 8,583,187 | B2 * | 11/2013 | Kim | G06F 1/1656 361/679.01 |
| 9,547,192 | B2 * | 1/2017 | Fujita | G02F 1/13338 |
| 2009/0011197 | A1 * | 1/2009 | Matsuhira | G02F 1/133308 428/192 |

(Continued)

FOREIGN PATENT DOCUMENTS

| | | |
|---|---|---|
| JP | 2010-66711 A | 3/2010 |
| JP | 2011-102972 A | 5/2011 |

*Primary Examiner* — Tuan T Dinh
*Assistant Examiner* — Rockshana Chowdhury
(74) *Attorney, Agent, or Firm* — Sughrue Mion, PLLC

(57) ABSTRACT

To provide a display device of high quality and high reliability by securely sealing the gap between the bezel and the display panel even when variation is generated in the gap. The display device includes: a display panel including a display face; a bezel which includes a frame part and an aperture end that is on the inner side of the frame part, and covers the fringe of the display panel on the display face side by the frame part; a frontal panel provided by sandwiching the bezel on the display face side of the display panel; and a resin member provided along the whole circumference of the aperture end of the bezel. The resin member has a first resin member formed on the display face and a second resin member formed to cover over the first resin member and a surface of the bezel opposing to the frontal panel.

14 Claims, 25 Drawing Sheets

(56) References Cited

U.S. PATENT DOCUMENTS

2010/0231821 A1\* 9/2010 Tsuji ................. G02F 1/133308
　　　　　　　　　　　　　　　　　　　　349/58
2011/0026202 A1\* 2/2011 Kai ....................... G06F 3/0414
　　　　　　　　　　　　　　　　　　　　361/679.01

\* cited by examiner

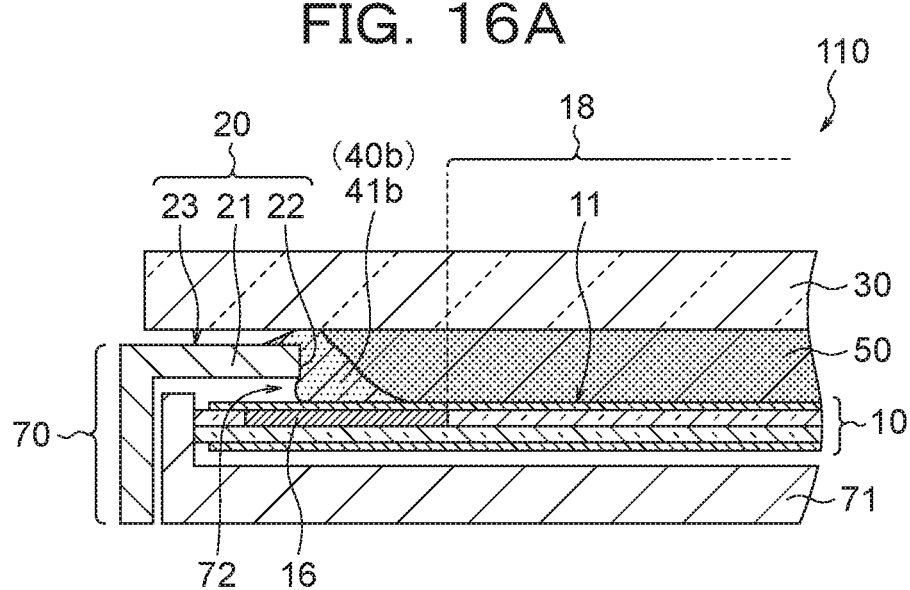
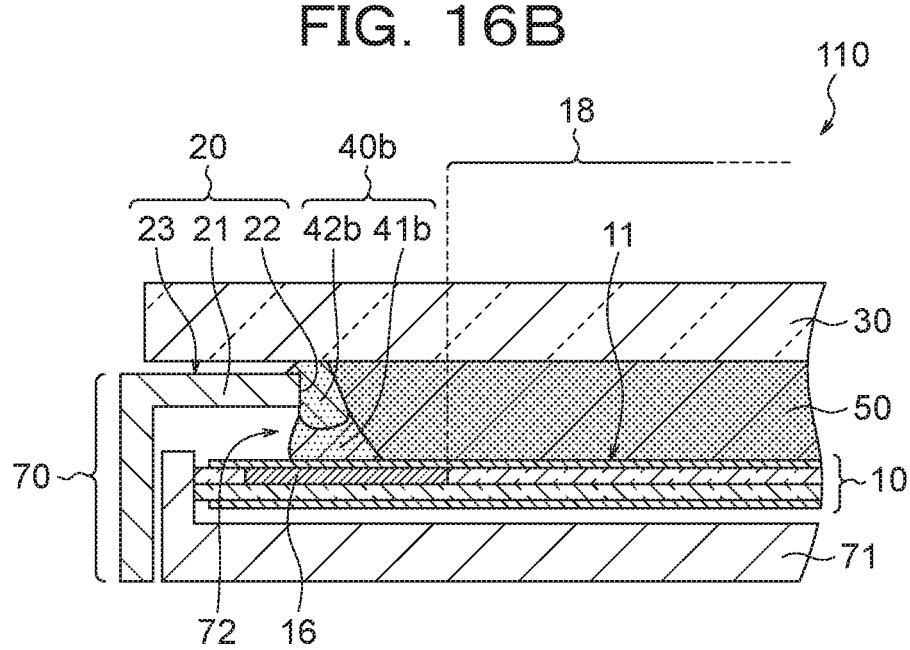

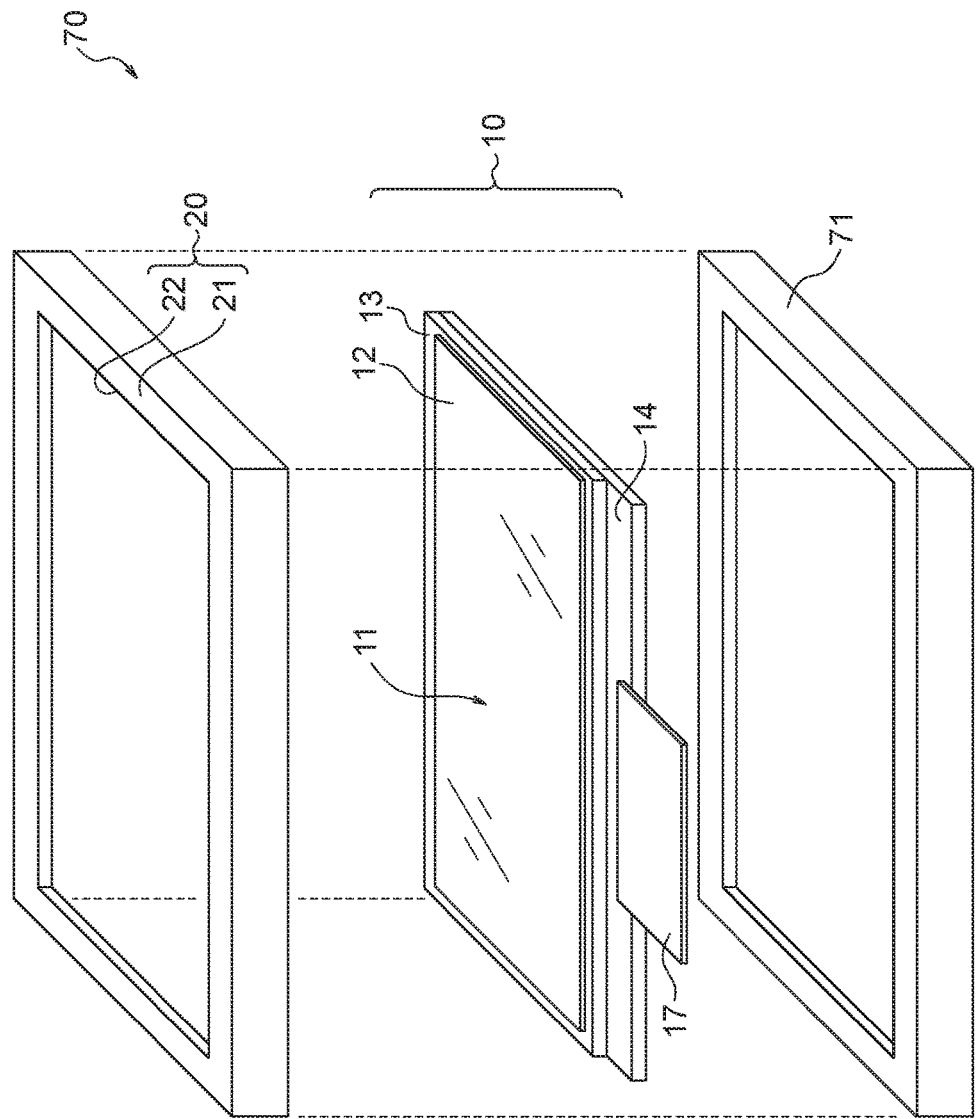

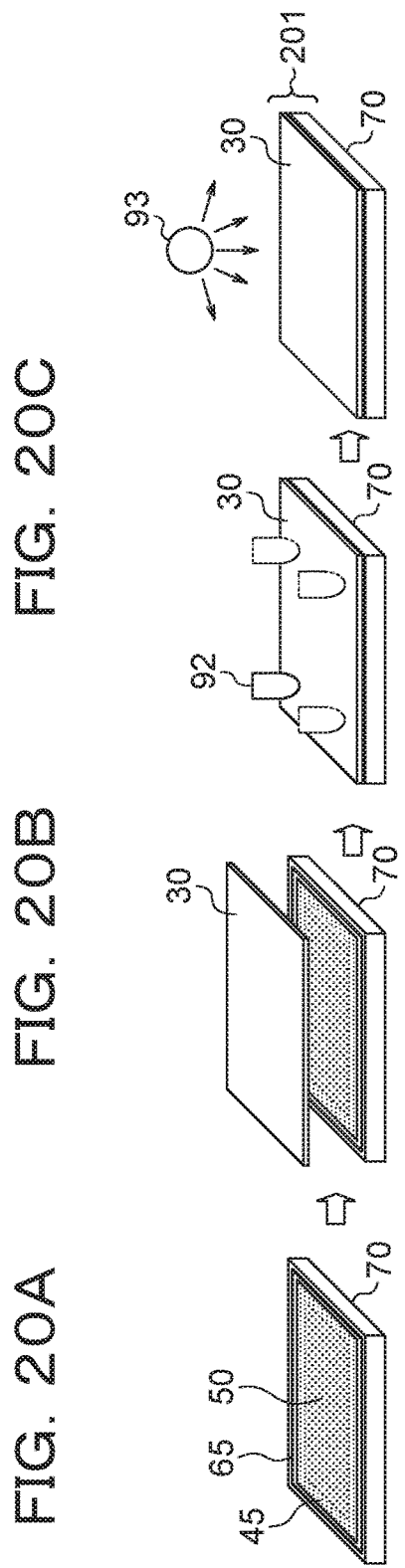

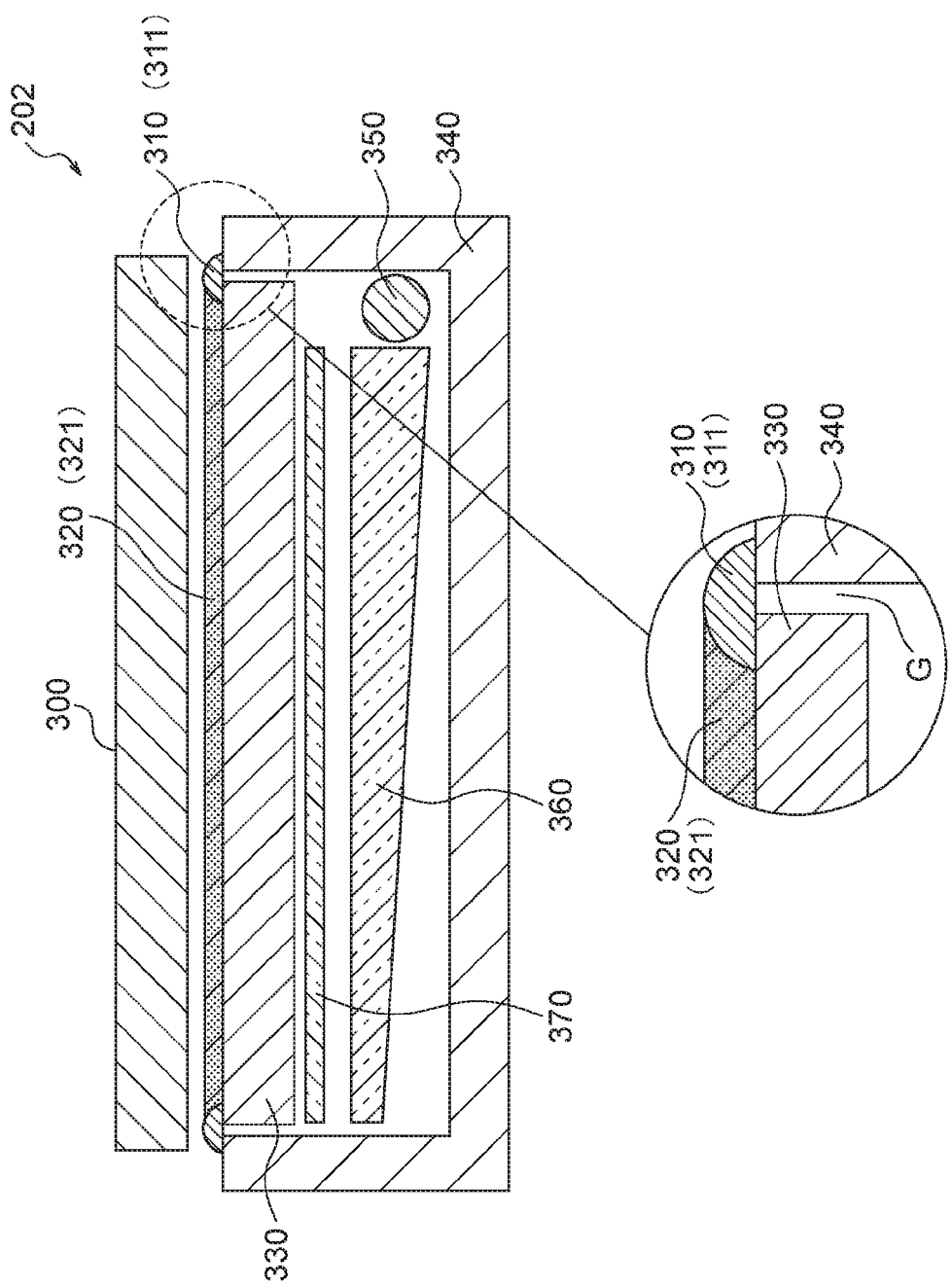

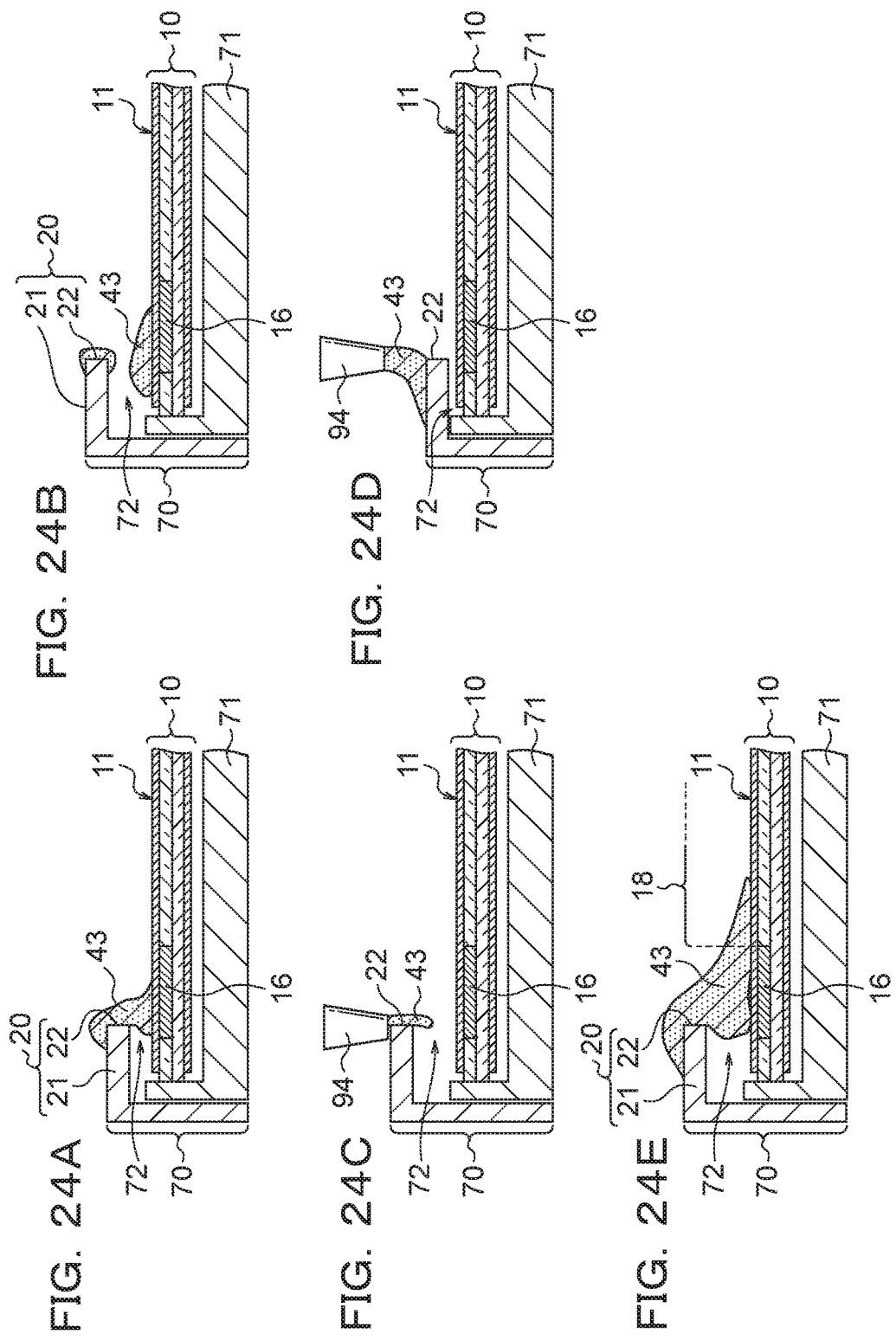

DISPLAY DEVICE AND MANUFACTURING METHOD THEREOF

CROSS-REFERENCE TO RELATED APPLICATION

This application is based upon and claims the benefit of priority from Japanese patent application No. 2015-045078, filed on Mar. 6, 2015, the disclosure of which is incorporated herein in its entirety by reference.

BACKGROUND OF THE INVENTION

1. Field of the Invention

The present invention relates to a display device such as a liquid crystal display device, for example, and to a manufacturing method thereof.

2. Description of the Related Art

Recently, the number of display devices each having a frontal panel such as a touch panel or a decorated panel on a liquid crystal display module as a device for display is increasing. A touch panel is an input interface component. A decorated panel is a reinforced glass or the like on which printing is applied for decoration for design qualities and protection of the display face.

When the frontal panel is loaded on the liquid crystal display module, there is normally an air layer exiting between the liquid crystal panel surface and the frontal panel. Thus, due to a difference in the refractive indexes of the frontal panel (e.g., a glass substrate) and the air layer, light is reflected in the interface between those. Due to the interface reflection, visibility of the displayed images becomes deteriorated greatly particularly under an open air environment.

For this, there is proposed a technique for improving the visibility of the displayed images by suppressing the interface reflection through filling an optical elastic resin exhibiting a refractive index close to that of the glass substrate of the frontal panel in the air layer portion and laminating the liquid crystal panel and the frontal panel. This technique for laminating the whole surfaces is called optical-bonding or direct-bonding, which provides not only an optical effect but also a mechanical effect such as preventing scattering when the frontal panel is cracked and improving the shock resistance. Therefore, such technique has come to be employed broadly.

Further, even with outer circumference lamination (referred to as "air gap bonding" for convenience hereinafter) of the square-shaped frontal panel and the display module with the air layer provided therebetween, deterioration in the display quality caused by foreign matters inserted into the inside of the display face is an issue. Thus, even in such case, it is required to improve the display quality not only by simply pasting the frontal panel to the display module but by employing some kinds of devising.

Next, a display device of Related Technique 1 will be described by referring to FIG. 17 to FIG. 19C.

As shown in FIG. 17, a display module 70 includes: a display panel 10 such as a liquid crystal panel; a backlight 71 as a casing for housing the display panel 10; and a bezel 20 for covering the fringe of the display panel 10. The display panel 10 is constituted with: polarization plates 12, 15; a CF (Color Filter) substrate 13; a TFT (Thin Film Transistor) substrate 14; an FPC (Flexible Printed Circuit) substrate 17; and the like. The bezel 20 includes a frame part 21 and an aperture end 22.

As shown in FIG. 18, a display device 201 of Related Technique 1 is acquired by: forming a frame-like resin member 45 on the display module 70; applying an optical elastic resin (referred to as "OCR (Optically Clear Resin)" hereinafter) 50 inside thereof; and laminating a frontal panel 30 thereto from the above. The frontal panel 30 is a touch panel, which is constituted with a cover panel 31, a sensor glass 32, an FPC substrate 33, and the like. As described, the technique which laminates the whole surfaces of the display module 70 and the frontal panel 30 via a UV (Ultra Violet) curable OCR 50, for example, is the above-described optical-bonding.

As shown in FIG. 19B, with the optical-bonding, it is typical to form a dam-like resin member 45 formed with the same or a similar material as that of the OCR 50 in a gap 72 between the bezel 20 and the display panel 10 at the aperture end 22. The resin member 45 is formed to prevent the OCR 50 from permeated into the display module 70 from the gap 72 (for sealing up). Further, the resin member 45 is formed on a light-shielding film 16 between the aperture end 22 and a display region 18 since it is easily recognized as display unevenness when formed to cover the display region (pixel region) 18.

An optical sheet 73 and a backlight chassis 74 shown in FIG. 19B are a part of the backlight 71 shown in FIG. 17. Further, the polarization plate 15 shown in FIG. 19B is a part of the display panel 10.

Next, the process of the optical-bonding will be described by referring to FIG. 20A to FIG. 20G. First, the display module 70 is prepared (FIG. 20A). Subsequently, the UV curable resin is applied by a dispenser 91, and UV light is irradiated by following the applied track by using a spot UV light source 92 to tentatively cure the resin. Through keeping the applied shape, the resin member 45 is formed (FIG. 20B). Thereafter, the OCR 50 for pasting the whole surfaces is applied by slit coating, for example (FIG. 20C). A UV curable adhesive 65, for example, is disposed on the bezel in the outer circumference of the resin member 45 as necessary (FIG. 20D), and the frontal panel 30 and the display module 70 are laminated under a reduced pressure environment, for example (FIG. 20E). Thereafter, the four corners are tentatively fixed by UV irradiation performed by the spot UV light source 92, for example (FIG. 20F). Further, through irradiating a prescribed UV light amount to the whole surfaces by using a conveyor UV irradiation device or the like including a UV light source 93 for adhesive-curing the frontal panel 30 to the display module 70 so as to acquire the display device 201 (FIG. 20G).

However, there is heaving generated in the bezel 20 of the display module 70 shown in FIG. 19A and FIG. 19B because of variation in crafting members and variation in assembling. Thus, due to the heaving of the bezel 20, there is generated variation in the gap 72 between the bezel 20 and the display panel 10. Further, in a large part of the gap 72, the resin member 45 may flow out and permeate into the back face side of the bezel 20 before UV-curing the resin member 45 (this phenomenon is called "sinkage"). As a result, as shown in FIG. 19C, the proper resin member 45 cannot be formed but the gap 75 tends to be formed between the resin member 45 and the aperture end 22. Further, when the gap 75 exists at the time of lamination, the OCR 50 permeates into the inside of the display module 70 from the gap 75. The OCR 50 permeated into the inside of the display module 70 is not cured even after a passage of time since the UV light is not irradiated, and spreads to every gaps within the display module 70. In the worst cases, display fault may be caused because the OCR 50 spreads to the backlight irradiating surface by passing through the back face of the display panel 10 and the optical sheet 73 or the uncured OCR 50 may leak out from the display module 70.

Next, a display device of Related Technique 2 will be described by referring to FIG. 21.

The display device of the Related Technique 2 is designed to overcome an issue of permeation of OCR into the inside of the module (see Japanese Unexamined Patent Publication 2010-66711 (Patent Document 1)). The display device 202 of the Related Technique 2 includes: an optical member 300; a first adhesive 310 (flow-sealing part 311); a second adhesive 320 (applied region 321); a display element 330; a casing 340; a light source 350; a light guide plate 360; an optical film 370; and the like. It is considered with the Related Technique 2 to prevent the uncured second adhesive 320 (applied region 321) from contaminating inside the casing 340 through providing the first adhesive 310 (flow-sealing part 311) along a gap G between the display element 330 and the casing 340 to seal the gap G (see paragraphs 0046 to 0051 and FIG. 2 of Patent Document 1).

However, there are following new issues (1) and (2) in the display device of the Related Technique 2.

(1) As shown in FIG. 21, it is the object of the Related Technique 2 to form the flow-sealing part 311 on the same plane as the display element 330 and the casing 340 to bury the gap G on the plane by the flow-sealing part 311. In the meantime, as shown in FIG. 19B, the Related Technique 1 is targeted for the gap 72 between the aperture end 22 and the display panel 10, i.e., a step between two different planes. That is, there is variation in the steps of the gap 72 of the present invention as described above so that the steps cannot be sealed sufficiently by simply applying a resin (corresponding to the first adhesive 310) along the gap 72. Thus, a space is easily generated between the resin member 45 and the aperture end 22. Further, even if the resin is to be applied along the gap 72, it is necessary to apply the resin by injecting it from the lateral direction of the gap 72. Therefore, it is technically difficult in terms of manufacture to apply the resin on the whole circumference of the steps of the gap 72 with high precision.

(2) As shown in FIG. 21, with the Related Technique 2, stresses (e.g., a pressurized stress and the like applied between the steps of applying the second adhesive 320 and pasting the components) in the manufacturing steps is imposed upon the display element 330 and the casing 340 after forming the flow-sealing part 311. Thus, when there is a step generated between the display element 330 and the casing 340, those are likely to be exfoliated. Specifically, as shown in FIG. 22A to FIG. 22C, let's look into a case where the flow-sealing part 311 of the Related Technique 2 is used for a structure of the present invention. In that case, the flow-sealing part 311 and the aperture end 22 are adhesively joined only by the thickness of the bezel 20 (see FIG. 20A). Therefore, when the stresses in the manufacturing steps described above are applied, the display panel 10 is bent so that the flow-sealing part 311 and the aperture end 22 are easily exfoliated (FIG. 22B). Thus, the OCR 50 leaks out to the back side of the display panel 10. Therefore, the issue of the present invention cannot be overcome by the Related Technique 2.

SUMMARY OF THE INVENTION

It is therefore an exemplary object of the present invention to stably achieve the substantiality with which the bezel and the display panel are not easily exfoliated through sealing the gap therebetween securely even when there is variation in the gap and to achieve a highly air-tight lamination structure of the display panel and the frontal panel, and to provide a high-quality and highly reliable display device as a result thereof.

The display device according to an exemplary aspect of the invention is a display device, which includes: a display panel which includes a display face; a bezel which includes a frame part and an aperture end on an inner side of the frame part, and covers a fringe of the display panel on the display face side with the frame part; a resin member provided along a whole circumference of the aperture end of the bezel; and a frontal panel provided on the display face side of the display panel in a state of sandwiching the bezel, wherein the resin member includes a first resin member formed on the display face, and a second resin member formed to cover over the first resin member and at least a surface of the bezel opposing to the frontal panel.

The manufacturing method of the display device according to another exemplary aspect of the invention is a method for manufacturing a display device which includes a display panel including a display face, a bezel including a frame part and an aperture end on an inner side of the frame part, and a frontal panel, and the method includes: a step of forming a first resin member by covering a fringe of the display panel on the display face side with the frame part of the bezel and applying a resin on the display face along a whole circumference of the aperture end of the bezel; a step of forming a second resin member by applying a resin to cover over the first resin member and a surface of the bezel opposing to the frontal panel; and a step of laminating the frontal panel to the display face side of the display panel where the first resin member and the second resin member are formed.

As an exemplary advantage according to the invention, it is possible to provide a high-quality and highly reliable display device since the gap can be securely filled even when there is variation in the gap between the bezel and the display panel through forming the first resin member on the display face and forming the second resin member formed to cover over the first resin member and the surface of the bezel opposing to the frontal panel.

BRIEF DESCRIPTION OF THE DRAWINGS

FIG. 16A is a sectional view showing a part where only a first resin member is formed according to a tenth exemplary embodiment, and FIG. 16B is a sectional view showing a part where the first resin member and a second resin member are formed according to the tenth exemplary embodiment;

FIG. 17 is a detailed perspective view showing a display module of a display device according to Related Technique 1;

FIG. 20A to FIG. 20G are perspective views showing a manufacturing method of the display device of the Related Technique 1, in which the steps are executed in order from FIG. 20A to FIG. 20G;

FIG. 21 is a fragmentary sectional view showing a display device of Related Technique 2;

FIGS. 24A-24E show fragmentary sectional views showing an example of fault in the Related Technique 3, in which FIG. 24A shows a normal state, FIG. 24B shows dam sinkage, FIG. 24C shows discharge fault 1, FIG. 24D sows discharge fault 2, and FIG. 24E shows a display unevenness factor; and FIGS. 25A-25C show fragmentary sectional views showing an issue of the Related Technique 3, in which FIG. 25A shows display unevenness, FIG. 25B shows light leakage and strength deterioration, and FIG. 25C shows frame expansion and external shape expansion.

DETAILED DESCRIPTION OF THE PREFERRED EMBODIMENTS

Figure 1:
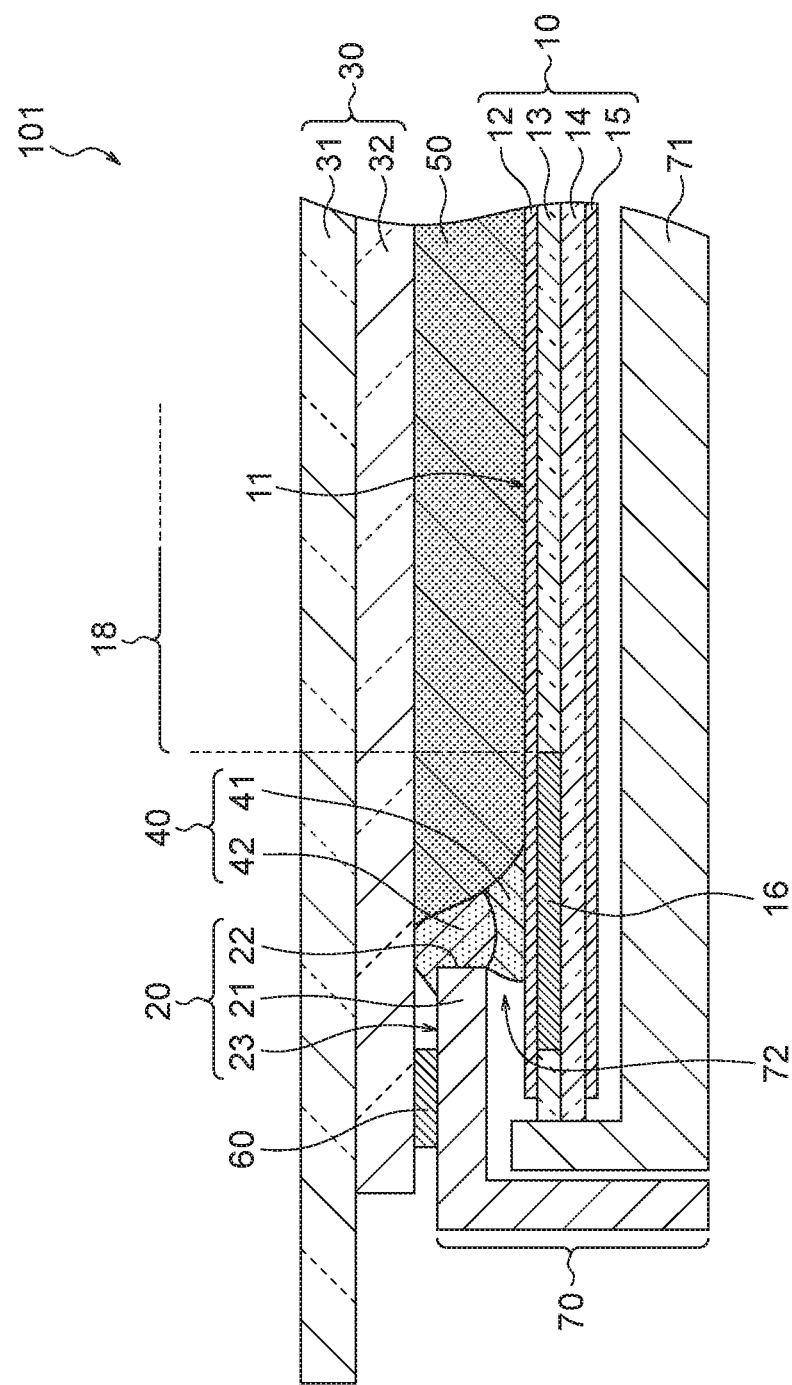
FIG. 1 is a fragmentary sectional view showing a display device according to a first exemplary embodiment.

Hereinafter, modes for embodying the present invention (referred to as "exemplary embodiment" hereinafter) will be described by referring to the accompanying drawings. In the current Specification and Drawings, same reference numerals are used for substantially same structural elements even if there is a little difference found therebetween. The shapes in the Drawings are illustrated to be easily comprehended by those skilled in the art, so that sizes and ratios thereof are not necessarily consistent with the actual ones. Sectional views only show cut faces, and depth structures thereof are omitted. "Comprise" in the current Specification and the scope of the appended claims also includes cases having an element other than those depicted therein. "Have", "include", and the like are also the same.

First, a display device of Related Technique 3 as a basis of the present invention will be described by referring to FIG. 23 to FIG. 25C.

Figure 23:
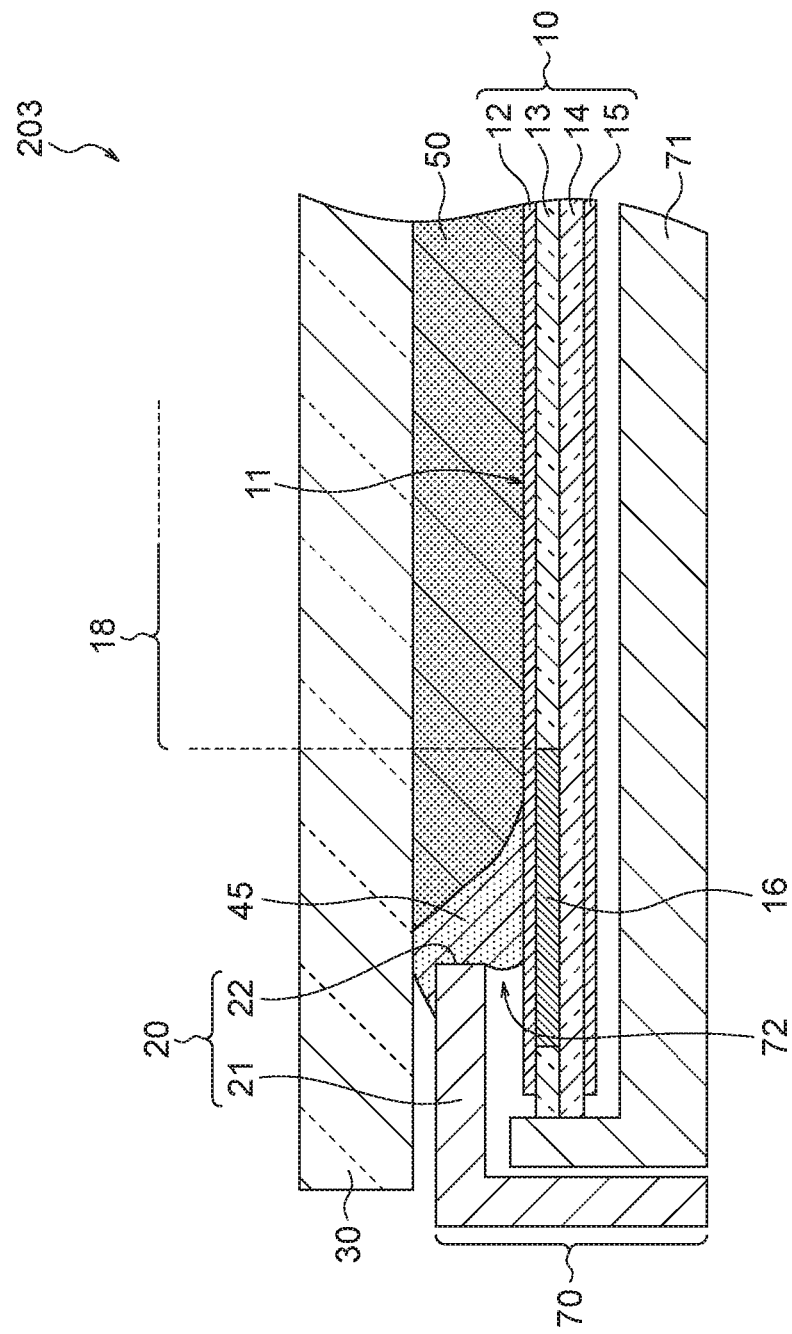
FIG. 23 is a fragmentary sectional view showing a display device of Related Technique 3.

As shown in FIG. 23, a display device 203 of the Related Technique 3 includes: a display panel 10 having a display face 11; a bezel 20 which has a frame part 21 and an aperture end 22 that is on the inner side of the frame part 21, and covers the fringe of the display panel 10 on the display face 11 side by the frame part 21; a frontal panel 30 that is provided by sandwiching the bezel 20 on the display face 11 side of the display panel 10; a resin member 45 provided along the whole circumference of the aperture end 22 of the bezel 20; and an OCR 50 filled between the display face 11 and the frontal panel 30. Note here that the display face 11 means the entire region of a polarization plate 12 on the frontal panel 30 side (this is the same in the followings).

A CF substrate 13 and a TFT substrate 14 are provided by opposing to each other via liquid crystal (not shown), and polarization plates 12, 15 are provided on the outer sides of the CF substrate 13 and the TFT substrate 14, respectively, to form the display panel 10. The display panel 10 is loaded on a backlight unit 71, and the bezel 20 and the backlight unit 71 are fixed by a fitting structure (not shown) to form a display module 70. The whole surfaces of the display module 70 and the frontal panel 30 such as a touch panel are laminated via the resin member 45 and the OCR 50. Note here that the resin member 45 is provided by covering over a step of the gap 72 between the bezel 20 and the display panel 10. This structure is called as "halfway-applied structure" hereinafter. As described, forming a part of the resin member 45 to cover over the bezel 20 in the vicinity of the aperture end 22 makes it possible for the resin member 45 not to be exfoliated easily from the bezel 20 so that leak out of the OCR 50 can be suppressed. However, the inventors et al. of the present invention have verified that following issues are raised in the display device 203 of the Related Technique 3 in the process of further investigation.

The resin as the material for the resin member 45 is called herein as a "dam agent 43". The resin member 45 under a normal state is applied so that the dam agent 43 covers over the aperture end 22 and the display panel 10 as shown in FIG. 24A. However, as shown in FIG. 24B, when the gap 72 between the bezel 20 and the display panel 10 is large, "sink marks" are generated. Further, as shown in FIG. 24C and FIG. 24D, when there is variation generated in the distance between a nozzle 94 of a resin applying dispenser and the surface of the bezel 20, discharge fault of the dam agent 43 tends to occur. As described, it is difficult to stably form the resin member 45, so that sealing fault tends to occur (sealing between the resin member 45 and the aperture end 22 of the bezel 20 cannot be done properly). Further, if the applying amount of the dam agent 43 is increased to prevent such fault, a part of the dam agent 43 covers over the display region 18 as shown in FIG. 24E, thereby causing display unevenness and the like. That is, with the Related Technique 3, it is difficult to apply the dam agent 43 to be in a proper shape over the entire circumference of the aperture end 22. Thus, there is such an issue that the resin member 45 that enables sealing cannot be formed.

Figure 25A:
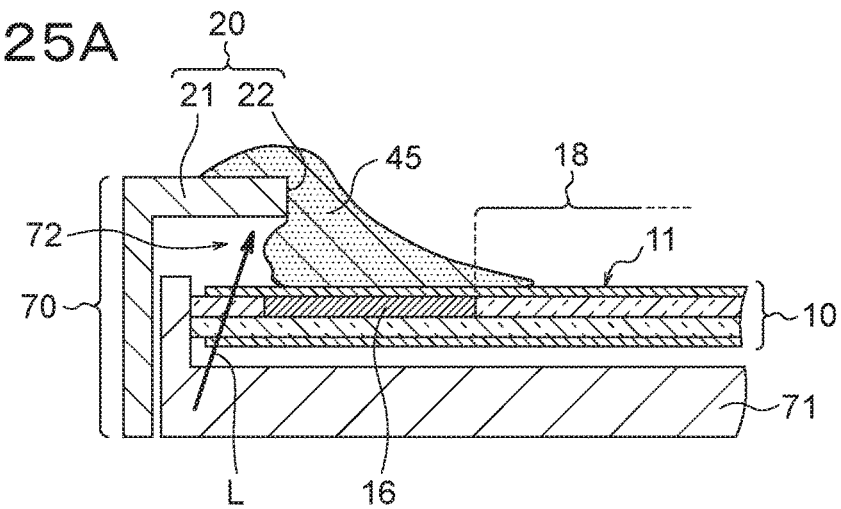
Figure 25B:
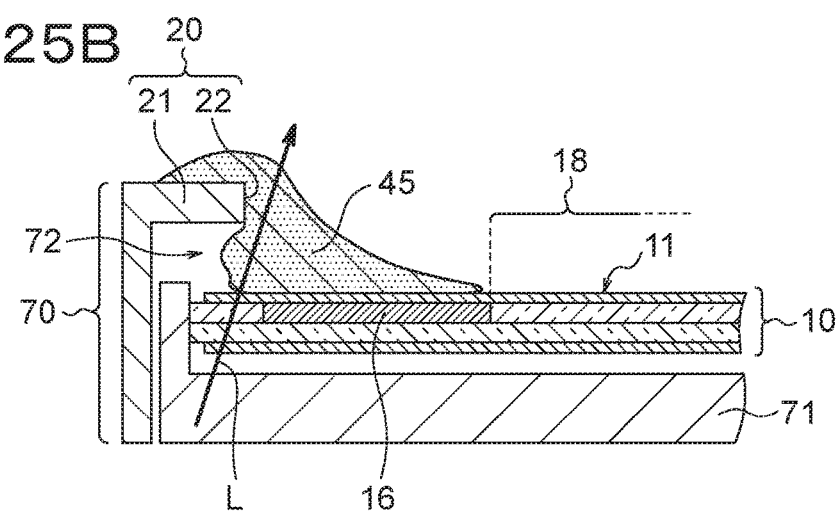
Figure 25C:
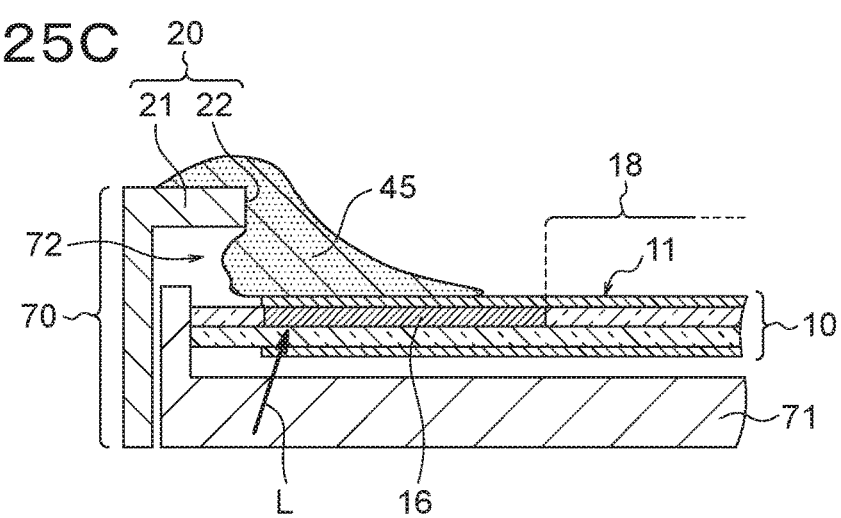

The reason for this issue is that it is difficult to apply the resin higher than the line width even when the viscosity characteristic and the like of a dispensable resin is taken into consideration in the relation between the drawn line width and the applied height in typical resin dispenser application. The limit of the substantial ratio between the drawn line width and the applied height is about 2:1. In the meantime, depending on the display module 70, the length (line width) from the aperture end 22 of the bezel 20 to the display region 18 is only about 1 to 2 mm. However, the applied height becomes 1 mm or more at the maximum when the thickness of the bezel 20 is added to the above-described gap 72 and variation thereof. Thus, as shown in FIG. 25A, a part of the resin member 45 is extruded out to the display region 18, thereby causing display unevenness. When the width of the frame part 21 is narrowed as shown in FIG. 25B to avoid it, backlight light L may be leaked out from the display face 11 other than the display region 18 and the strength of the bezel 20 may be deteriorated. Further, as shown in FIG. 25C, in a case where the resin member 45 is formed while increasing the applied amount of the dam agent so as to securely seal even a wide part of the gap 72, it is necessary to have a wide dimension from the aperture end 22 to the display region 18 so that the resin member 45 does not cover over the display region 18. Thus, in that case, the size of the display module 70 may be increased and narrowing of the frame of the display panel 10 may be obstructed.

Next, a display device according to a first exemplary embodiment will be described by referring to FIG. 1 to FIG. 7B.

Figure 2:
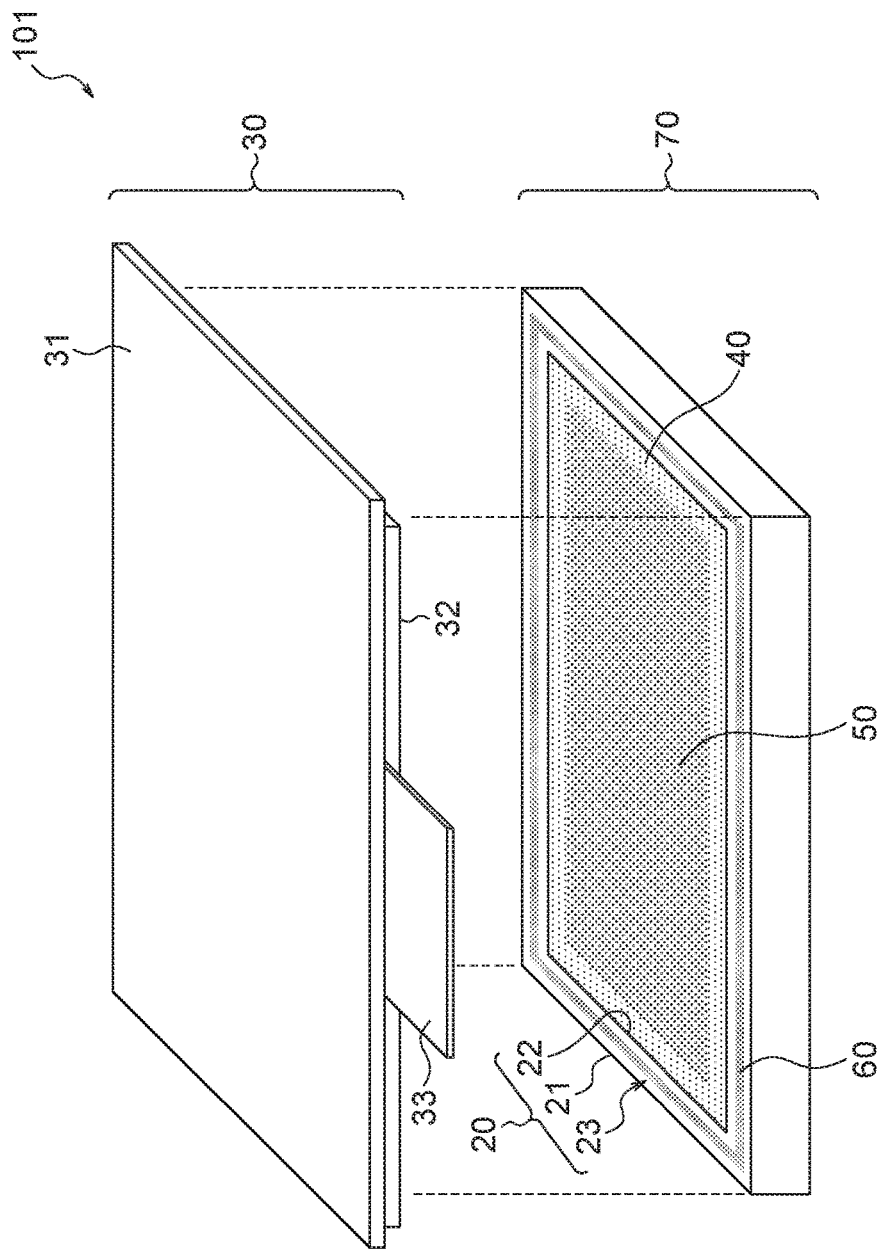
FIG. 2 is a detailed perspective view showing the display device according to the first exemplary embodiment.

As shown in FIG. 1 and FIG. 2, it is a feature of a display device 101 of the first exemplary embodiment that the resin member 45 (FIG. 23) of the Related Technique 3 is replaced with a resin member 40. That is, the display device 101 includes: a display panel 10 having the display face 11; the bezel 20 which has the frame part 21 and the aperture end 22 that is on the inner side of the frame part 21, and covers the fringe of the display panel 10 on the display face 11 side by the frame part 21; the frontal panel 30 that is provided by sandwiching the bezel 20 on the display face 11 side of the display panel 10; the resin member 40 provided along the whole circumference of the aperture end 22 of the bezel 20; and the OCR 50 filled between the display face 11 and the frontal panel 30. Further, the resin member 40 has a first resin member 41 formed on the display face 11 and a second resin member 42 that is formed to cover over the first resin member 41 and the surface (surface 23) of the bezel 20 which opposes to the frontal panel 30. Also, the display device 101 further includes an adhesive member 60 which is provided on the surface (surface 23) which opposes to the frontal panel 30 of the bezel 20 and the outer circumference of the resin member 40 for adhesively fixing the bezel 20 and the frontal panel 30.

In other words, the resin member 40 in a halfway-applied structure stacked in a plurality of layers is formed over the whole circumference along the aperture end 22 of the bezel 20 of the display module 70, and the OCR 50 is filled in the display region 18 that is surrounded by the resin member 40. Further, on the surface 23 of the bezel 20, the adhesive member 60 is disposed by surrounding the resin member 40. The frontal panel 30 is pasted to the display module 70 via the resin member 40, the OCR 50, and the adhesive member 60.

The first resin member 41 is formed along the aperture end 22 of the bezel 20, and the second resin 42 is stacked to cover over the first resin member 41 and the bezel 20 to form the resin member 40. Further, the resin member 40 completely seals the gap 72 between the aperture end 22 and the display panel 10 without covering the display region 18. Furthermore, the vertex of the resin member 40 is higher than the surface 23 of the bezel 20. Thus, the resin member 40 supports the frontal panel 30 along with the OCR 50 on the display face 11 and keeps the space between the surface 23 of the bezel 20 and the frontal panel 30 to a specific distance. Further, the adhesive member 60 provided on the outer circumference of the resin member 40 adhesively fixes the both without being smashed excessively between the bezel 20 and the frontal panel 30.

The resin member 40 can be called as a "halfway-applied multilayered dam", the first resin member 41 can be called as a "first dam", and the second resin member 42 can be called as a "second dam", respectively.

Figure 3A:
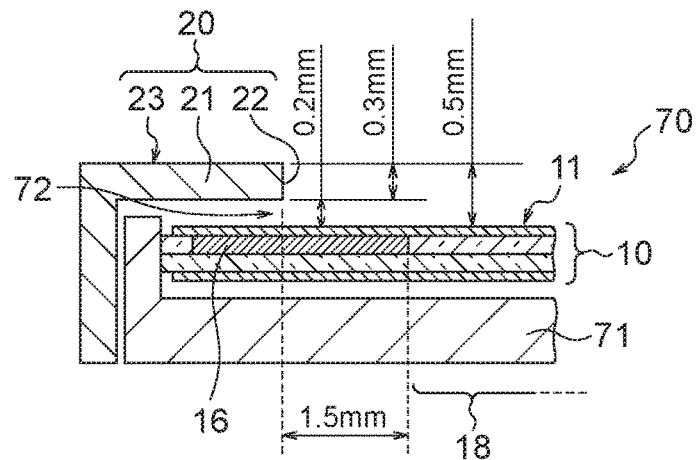
FIG. 3A is a fragmentary sectional view showing variation (designed value) in the size of the display module of the first exemplary embodiment.
Figure 3B:
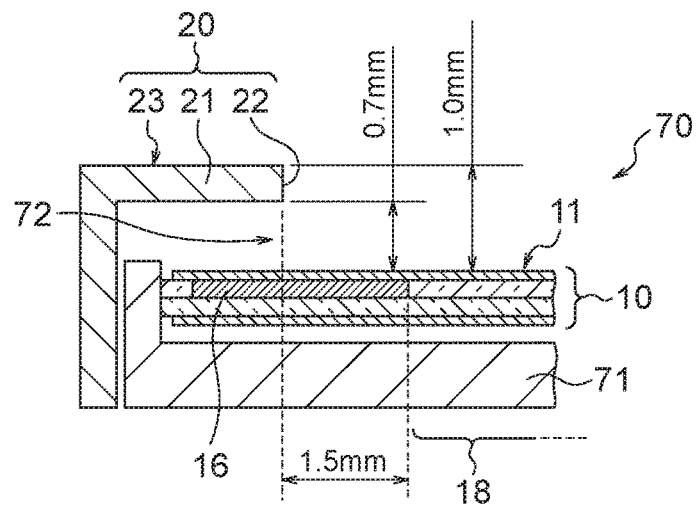
FIG. 3B is a fragmentary sectional view showing variation (maximum value) in the size of the display module of the first exemplary embodiment.
Figure 3C:
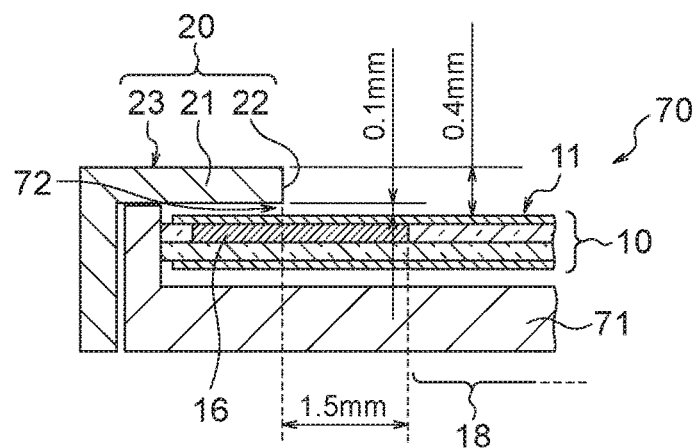
FIG. 3C is a fragmentary sectional view showing variation (minimum value) in the size of the display module of the first exemplary embodiment.

As shown in FIG. 3A, regarding the display module 70, while the designed size from the aperture end 22 of the bezel 20 to the display region 18 is 1.5 mm, the gap 72 between the display panel 10 and the bezel 20 is designed as 0.2 mm and the thickness of the bezel 20 is designed as 0.3 mm. However, due to various kinds of variation, the actual size of the gap 72 is within a range of 0.7 mm (FIG. 3B) at the maximum and 0.1 mm (FIG. 3C) at the minimum. That is, there is variation in the distance between the display face 11 of the display panel 10 and the surface 23 of the bezel 20 in a range of 0.4 to 1.0 mm.

Figure 4A:
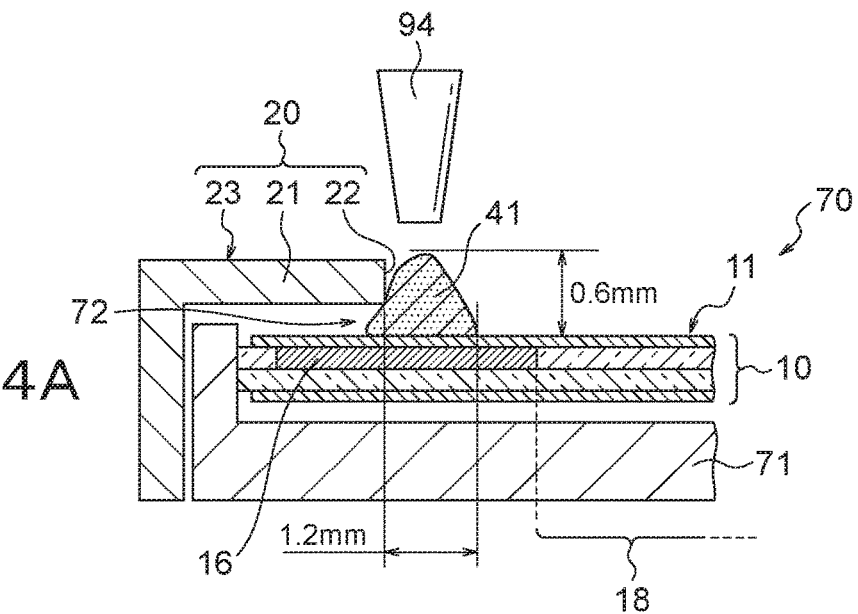
FIG. 4A is a fragmentary sectional view showing a manufacturing step of a first resin member corresponding to the variation (designed value) in the size of the display module of the first exemplary embodiment.
Figure 4B:
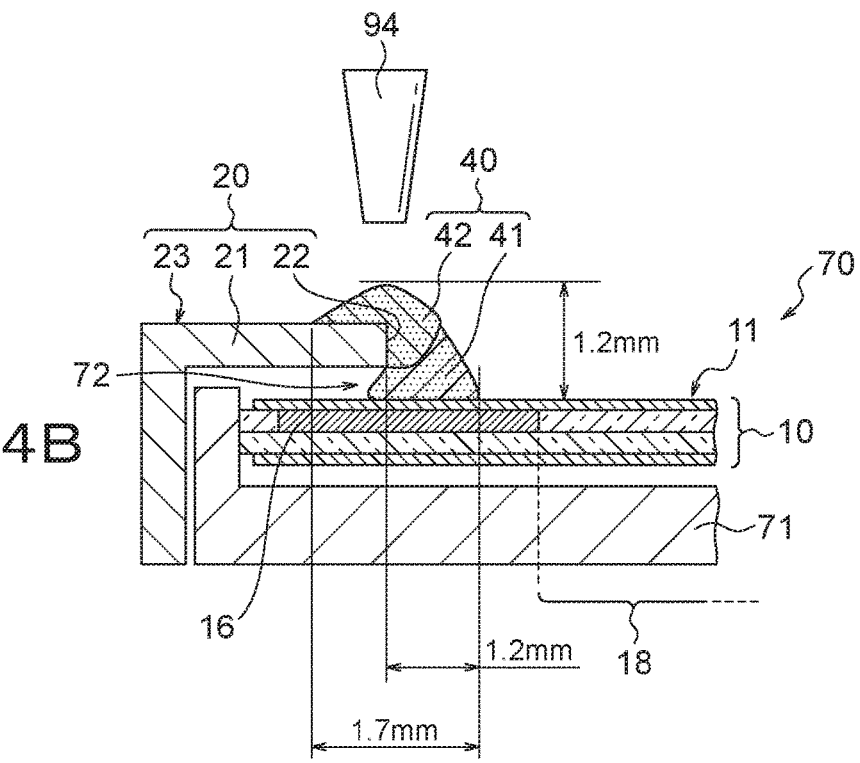
FIG. 4B is a fragmentary sectional view showing a manufacturing step of a second resin member corresponding to the variation (designed value) in the size of the display module of the first exemplary embodiment.

For such display module 70, the resin member 40 in a two-layered structure shown in FIG. 4A and FIG. 4B was formed in the first exemplary embodiment. As a manufacturing method thereof, first, a dam agent in a specific amount was applied at a specific speed by using a dispenser device (nozzle 94) to the display face 11 of the display panel 10 along the aperture end 22 of the bezel 20 and UV light was irradiated by the spot UV light source by following the dam agent applied track to form the first resin member 41 of 1.2 mm in width and 0.6 mm in height (FIG. 4A).

Subsequently, the dam agent is applied to cover over the vicinity of the vertex of the first resin member 41 and the surface 23 of the bezel 20, and UV light was irradiated in the same manner as the case of forming the first resin member 41 to form the second resin member 42 (FIG. 4B). At this time, the width of the dam agent reaching over the bezel 20 was designed to be about 0.5 mm. Thus, the resin member 40 formed in two layers of the first resin member 41 and the second resin member 42 was formed as 1.7 mm in the entire width (left to right direction in the drawing). Further, a halfway-applied multilayered structure of 1.2 mm in height while the width from the aperture end 22 to the display region 18 being remained as 1.2 mm as in that of the first resin member 41 can be achieved. Thereby, the gap 72 between the bezel 20 and the display panel 10 can be sealed completely.

Thereafter, the OCR 50 is applied to the whole surface, an adhesive 65 is applied to the entire region of the outer circumference by surrounding the resin member 40, and UV is irradiated after laminating the frontal panel 30 as a touch panel via the whole surface under a reduced pressure environment to achieve full curing. The display device 101 shown FIG. 2 is completed through a series of manufacturing process. As described, the manufacturing method of the display device 101 corresponds to the process of optical-bonding shown in FIG. 20A to FIG. 20G except for the manufacturing steps of the resin member 40.

Figure 5A:
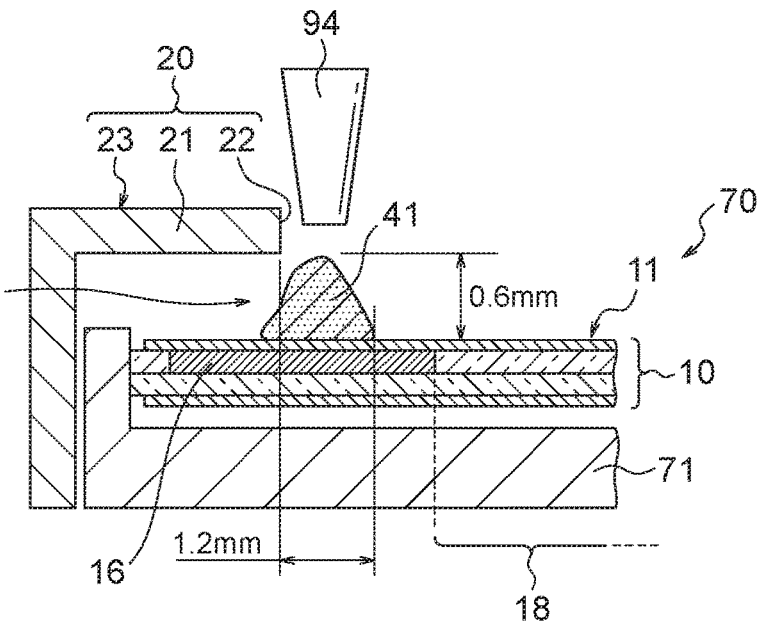
FIG. 5A is a fragmentary sectional view showing a manufacturing step of the first resin member corresponding to the variation (maximum value) in the size of the display module of the first exemplary embodiment.
Figure 5B:
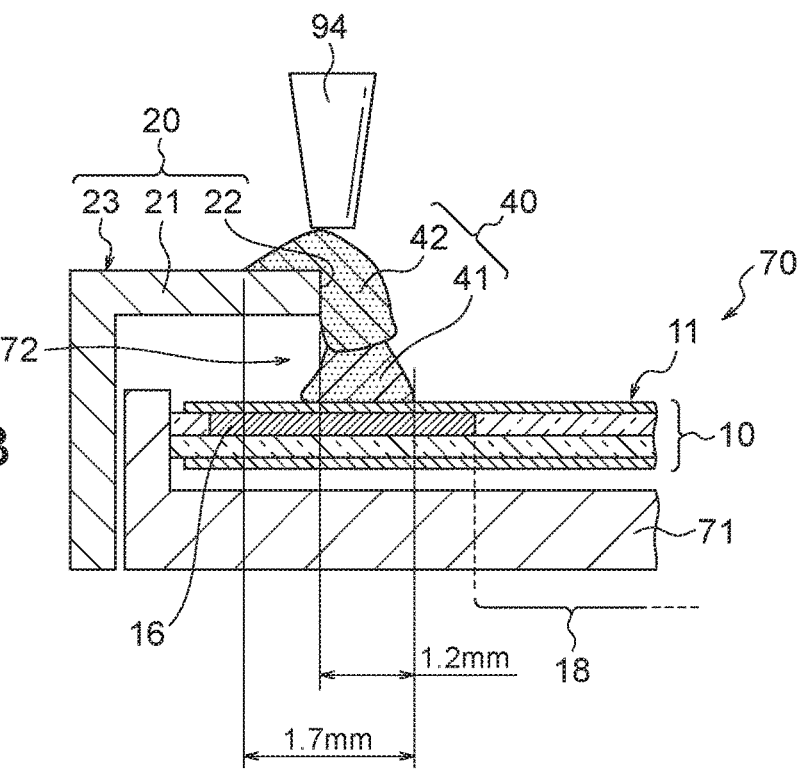
FIG. 5B is a fragmentary sectional view showing a manufacturing step of the second resin member corresponding to the variation (maximum value) in the size of the display module of the first exemplary embodiment.
Figure 6A:
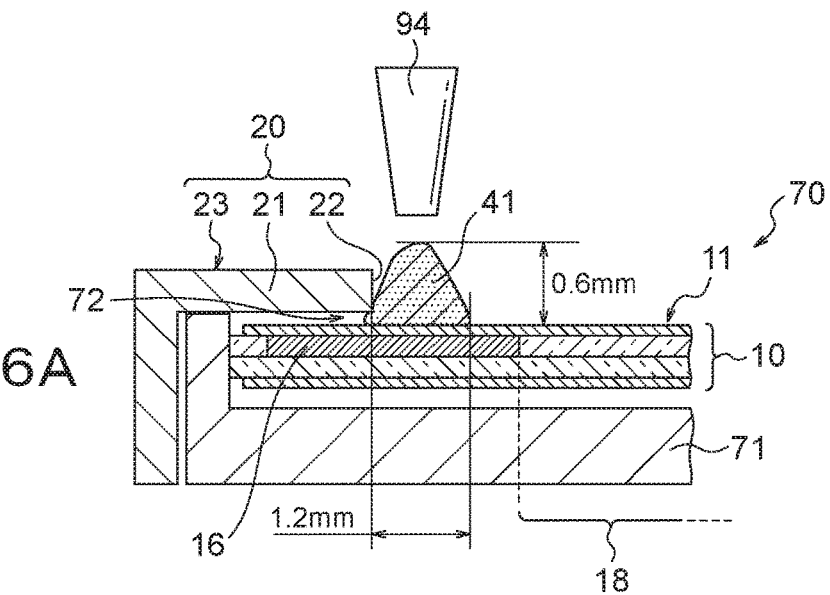
FIG. 6A is a fragmentary sectional view showing a manufacturing step of the first resin member corresponding to the variation (minimum value) in the size of the display module of the first exemplary embodiment.
Figure 6B:
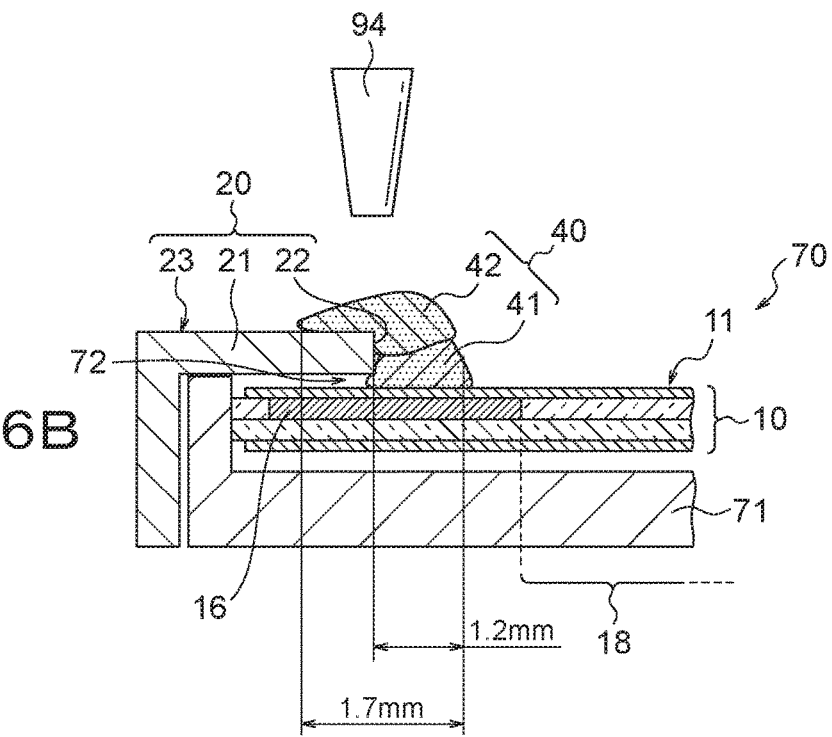
FIG. 6B is a fragmentary sectional view showing a manufacturing step of the second resin member corresponding to the variation (minimum value) in the size of the display module of the first exemplary embodiment.

Further, the manufacturing steps of the resin member 40 corresponding to the variation (maximum value) in the size of the display module 70 are shown in FIG. 5A, FIG. 5B, and the manufacturing steps of the resin member 40 corresponding to the variation (minimum value) in the size of the display module 70 are shown in FIG. 6A, FIG. 6B.

With the manufacturing method of the first exemplary embodiment, tentative curing is done by irradiating UV light simultaneously when applying the dam agent. However, in a case where the viscosity of the dam agent is high and the applied shape can be maintained for a specific time, UV light may be irradiated collectively after applying the dam agent to the whole circumference or UV tentative curing itself may be unnecessary in some cases. Further, "tentative curing" is done when forming the halfway-applied multilayered dam because the border may become easily recognized due to a difference in the refractive index with respect to the OCR when the dam agent is cured excessively in a case of performing optical-bonding by using the OCR. Thus, it is not essential to employ "tentative curing" if there is not any specific problem. Furthermore, the dam agent is not limited to a UV curable material, and any curable means can be employed such as moisture curable type, thermosetting type, or the like.

In addition, it is a feature of the manufacturing method of the first exemplary embodiment to have at least two layers or more of dam agent applying step and a dam forming step (e.g., UV tentative curing) for forming the resin member 40. An OCR applying step (in a case of optical-bonding) required for manufacturing the display device having the frontal panel, a laminating step, or the like are not limited to be executed under the reduced pressure environment. A well-known laminating method performed under an atmospheric pressure environment may be employed as well. For example, it is possible to employ: a method (an inversion laminating method) with which OCR is applied to the frontal panel side under an atmospheric pressure environment, and the frontal panel is inverted and laminated with the display module; a method (gap dispensing method: see Japanese Unexamined Patent Publication 2011-102972 (Patent Document 2)) with which a prescribed gap amount is secured between the frontal panel and the display module to be disposed in parallel, and OCR is filled between the gap; and the like.

Next, the effects of the display device 101 according to the first exemplary embodiment will be described.

In the first exemplary embodiment, the gap 72 between the aperture end 22 and the display panel 10 is completely sealed by the resin member 40. Further, the dam is not to be destroyed in the manufacturing steps due to the halfway-applied structure, so that the uncured OCR 50 does not permeate into the inside of the display module 70. Therefore, it is possible to provide the display device 101 with high display reliability.

Further, since the distance between the surface 23 of the bezel 20 and the frontal panel 30 can be maintained constant by the resin member 40, it is possible to prevent the adhesive member 60 provided on the outer circumference of the resin member 40 from being smashed excessively by the weight of the frontal panel 30 to cause appearance inferiority and adhesion fault. Because the resin member 40 exhibits a secure sealing effect, there is almost no leak out of the OCR 50 onto the bezel 20 by going over the resin member 40. That is, an effect of using the leaked OCR 50 instead of the adhesive member 60 cannot be expected.

Figure 7A:
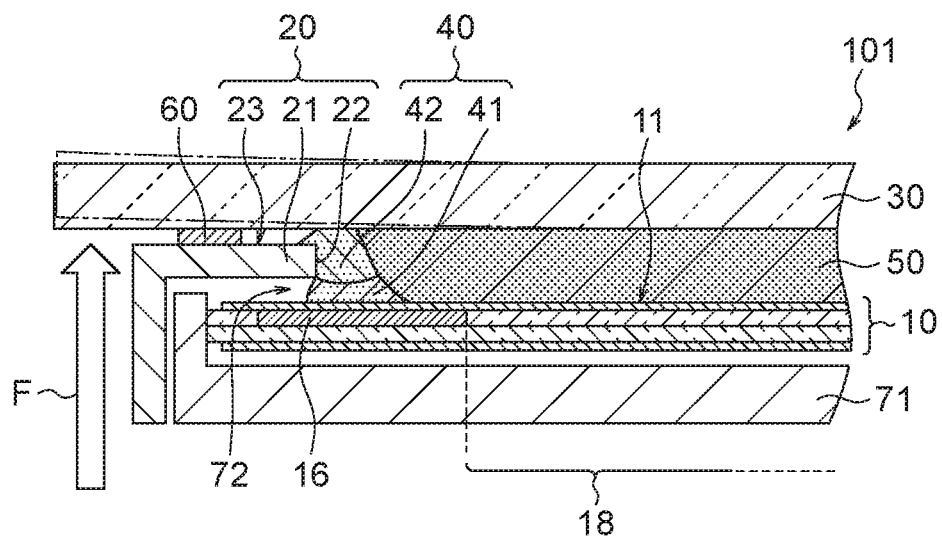
FIG. 7A is a fragmentary sectional view (with an adhesive member) for describing the effect of the display device according to the first exemplary embodiment.
Figure 7B:
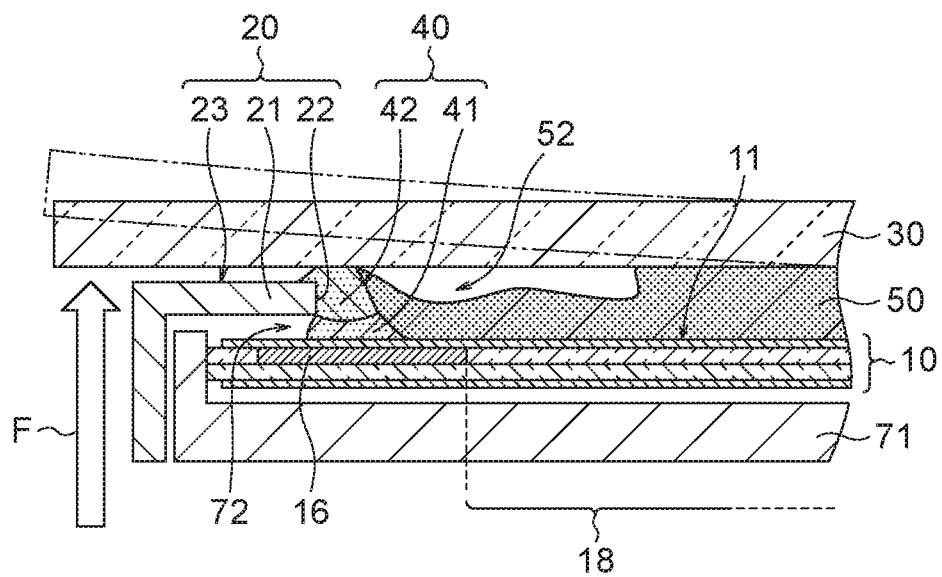
FIG. 7B is a fragmentary sectional view (without the adhesive member) for describing the effect of the display device according to the first exemplary embodiment.

Further, as shown in FIG. 7B, in a case where there is no adhesive member 60, when an external force F works on the OCR 50 on the display face 11 in an exfoliating direction, exfoliation of the frontal panel 30 and the OCR 50 (OCR separation 52) easily occurs by having the resin member 40 as a fulcrum. In the meantime, as shown in FIG. 7A, with the first exemplary embodiment, the adhesive member 60 provided on the bezel 20 serves as a fulcrum. Thus, the distance to the fulcrum becomes shorter, so that the resistance for exfoliation of the OCR 50 even for the same external force F can be improved. As a result, even when laminating the frontal panel 30 of a larger external shape than that of the display module 70, secure adhesive reinforcement can be done so that a stress with which the OCR 50 on the display face 11 is exfoliated is not imposed. The adhesive strength of the adhesive member 60 is desirable to be stronger than that of the OCR 50 in view of reinforcement. However, if it is equivalent or higher than that of the OCR 50, a certain level of reinforcing effect can be achieved.

In addition, the force applied at the time of pressing the frontal panel 30 is received by both the resin member 40 and the adhesive member 60, so that it is possible to suppress generation of ripple-like unevenness on the display panel 10 caused by receiving concentrated pressures. Further, the resin member 40 can be formed in a thick dam-like shape even though the width is narrow. Thus, it is possible to provide the narrow-framed display device 101 without causing light leakage of the display module 70 and lack of structural strength. Other structures, operations, and effects of the first exemplary embodiment are the same as those of the Related Technique 3.

Figure 8:
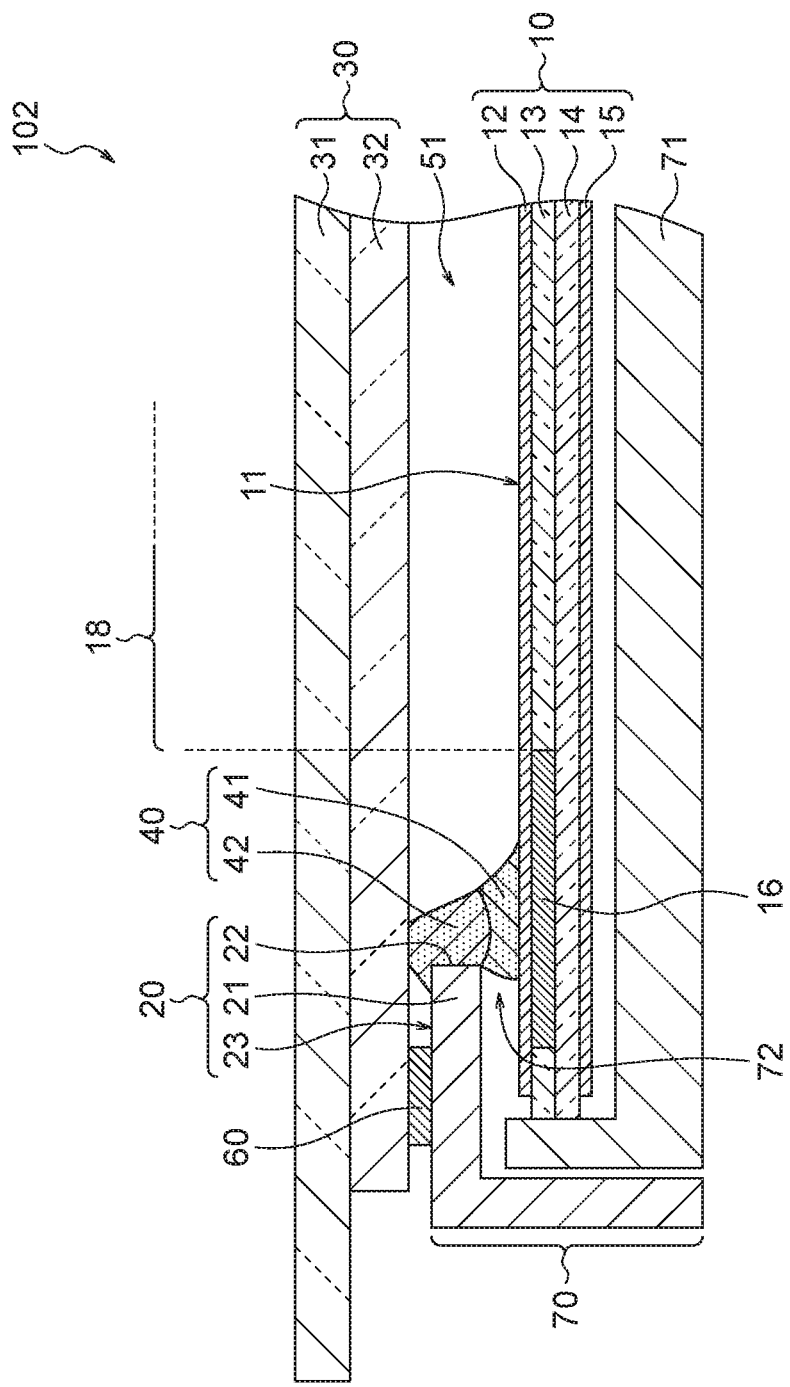
FIG. 8 is a fragmentary sectional view showing a display device according to a second exemplary embodiment.

Next, a display device according to a second exemplary embodiment will be described by referring to FIG. 8.

It is a feature of a display device 102 of the second exemplary embodiment that the OCR 50 (FIG. 1) of the first exemplary embodiment is replaced with an air layer 51. In other words, the second exemplary embodiment employs a structure in which the display panel 10 and the frontal panel 30 are laminated via the air layer 51 (air gap bonding). That is, the display face 11 is not laminated via the whole surface with OCR, and the adhesive member 60 provided on the outer circumference of the resin member 40 functions to adhesively fix the frontal panel 30 and the display module 70. As a laminating method, it is fine to perform lamination under an atmospheric pressure. However, as in the case of the first exemplary embodiment, it is executed under a reduced pressure environment in the second exemplary embodiment. As in the case of the first exemplary embodiment, the gap 72 between the bezel 20 and the display panel 10 is completely sealed by the resin member 40 in the structure of the second exemplary embodiment. Thus, dusts generated from the inside of the display module 70 does not enter the display region 18 (air layer 51), and the frontal panel 30 and the display region 18 are shielded by the adhesive member 60 or the resin member 40. Therefore, intrusion of foreign matters from the outside of the display module 70 can be prevented securely, so that it is possible to provide the display device 102 of high display reliability. Other structures, operations, and effects of the second exemplary embodiment are the same as those of the first exemplary embodiment and the like.

Figure 9:
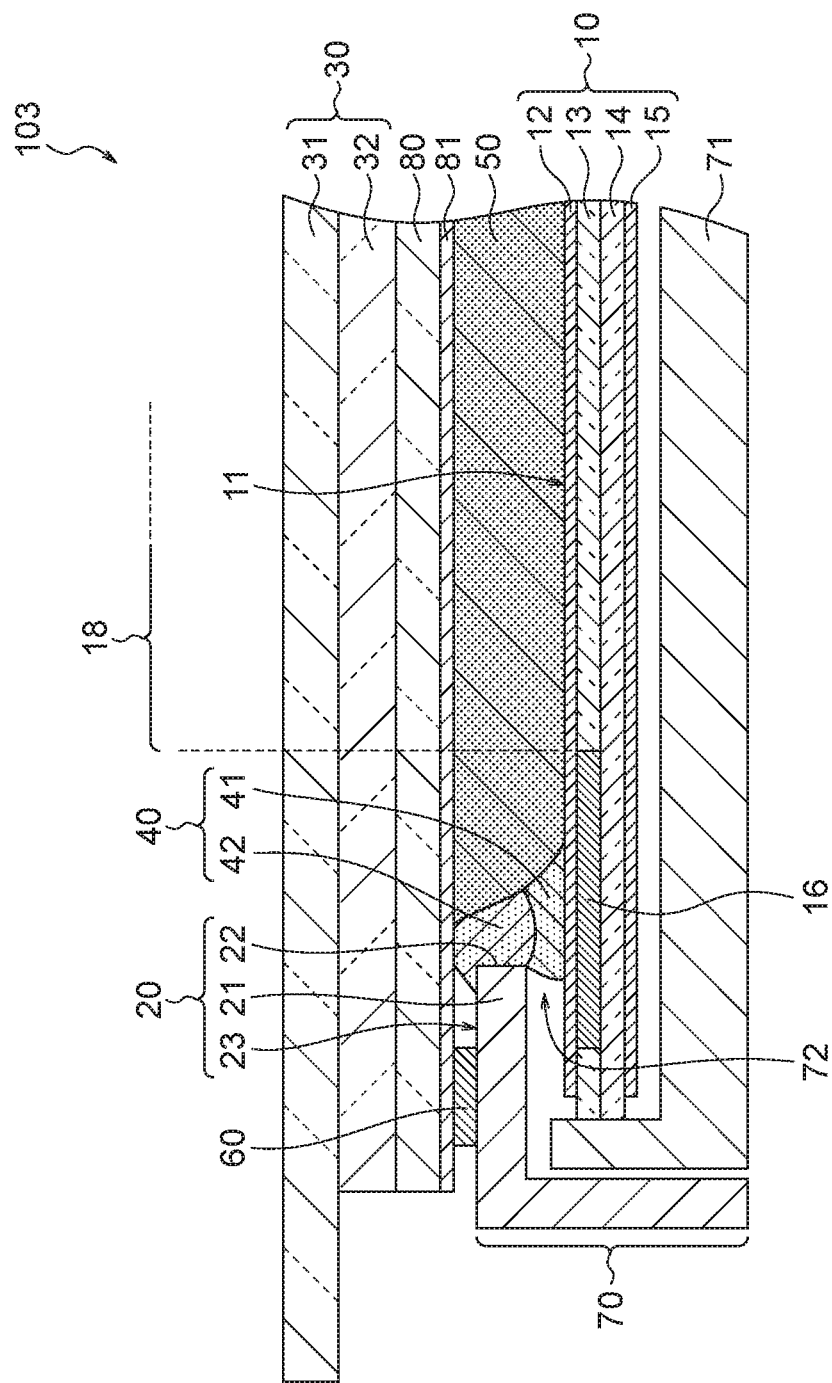
FIG. 9 is a fragmentary sectional view showing a display device according to a third exemplary embodiment.

Next, a display device according to a third exemplary embodiment will be described by referring to FIG. 9.

It is a feature of a display device 103 of the third exemplary embodiment that a shield substrate 80 is added to the display device 101 (FIG. 1) of the first exemplary embodiment. The shield substrate 80 is an EMI (Electro-Magnetic Interference) substrate, which has a conductive layer 81 on its one face. That is, in the third exemplary embodiment, the shield substrate 80 is inserted between the display module 70 and the frontal panel 30. The shield substrate 80 has an electromagnetic wave shielding function, so that it prevents malfunctioning of the frontal panel 30 caused due to the electromagnetic waves irradiated from the display module 70. On one face of the shield substrate 80, the conductive layer 81 made with a transparent conductive film such as ITO (Indium Tin Oxide) is formed uniformly or in a mesh form. Further, in order to set the potential of the conductive layer 81 to GND of the display module 70, it is possible to form at least the uppermost layer (corresponding to the second resin member 42 in FIG. 9) of the resin member 40 or the adhesive member 60 disposed on the outer circumference of the resin member 40 with a conductive adhesive material such as Ag paste, for example. The bezel 20 of the display module 70 is formed with a metal, and connected to GND within the display module 70. With the third exemplary embodiment, the metal-made bezel 20 and the conductive layer 81 of the shield substrate 80 can be GND-connected securely through forming the uppermost layer of the resin member 40 or the adhesive member 60 with a conductive material. Thus, it is possible to provide the display device 103 with a high electromagnetic eave resistance. Other structures, operations, and effects of the third exemplary embodiment are the same as those of the first exemplary embodiment and the like.

Figure 10:
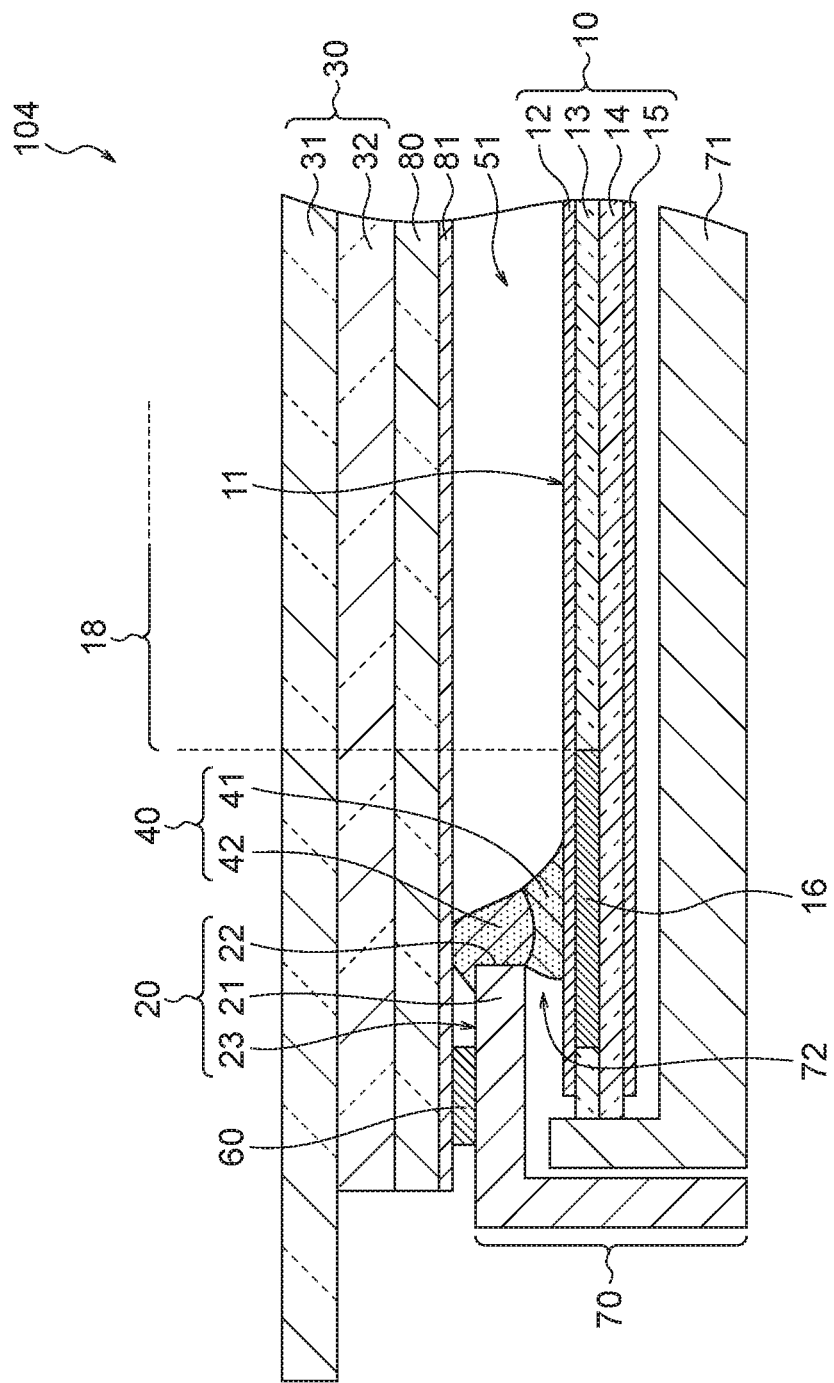
FIG. 10 is a fragmentary sectional view showing a display device according to a fourth exemplary embodiment.

Next, a display device according to a fourth exemplary embodiment will be described by referring to FIG. 10.

It is a feature of a display device 104 of the fourth exemplary embodiment that the shield substrate 80 is added to the display device 102 (FIG. 8) of the second exemplary embodiment. Naturally, insertion of the shield substrate 80 can be applied also to an air bonding structure as in the case of the fourth exemplary embodiment. Other structures, operations, and effects of the fourth exemplary embodiment are the same as those of the second exemplary embodiment and the like.

Figure 11:
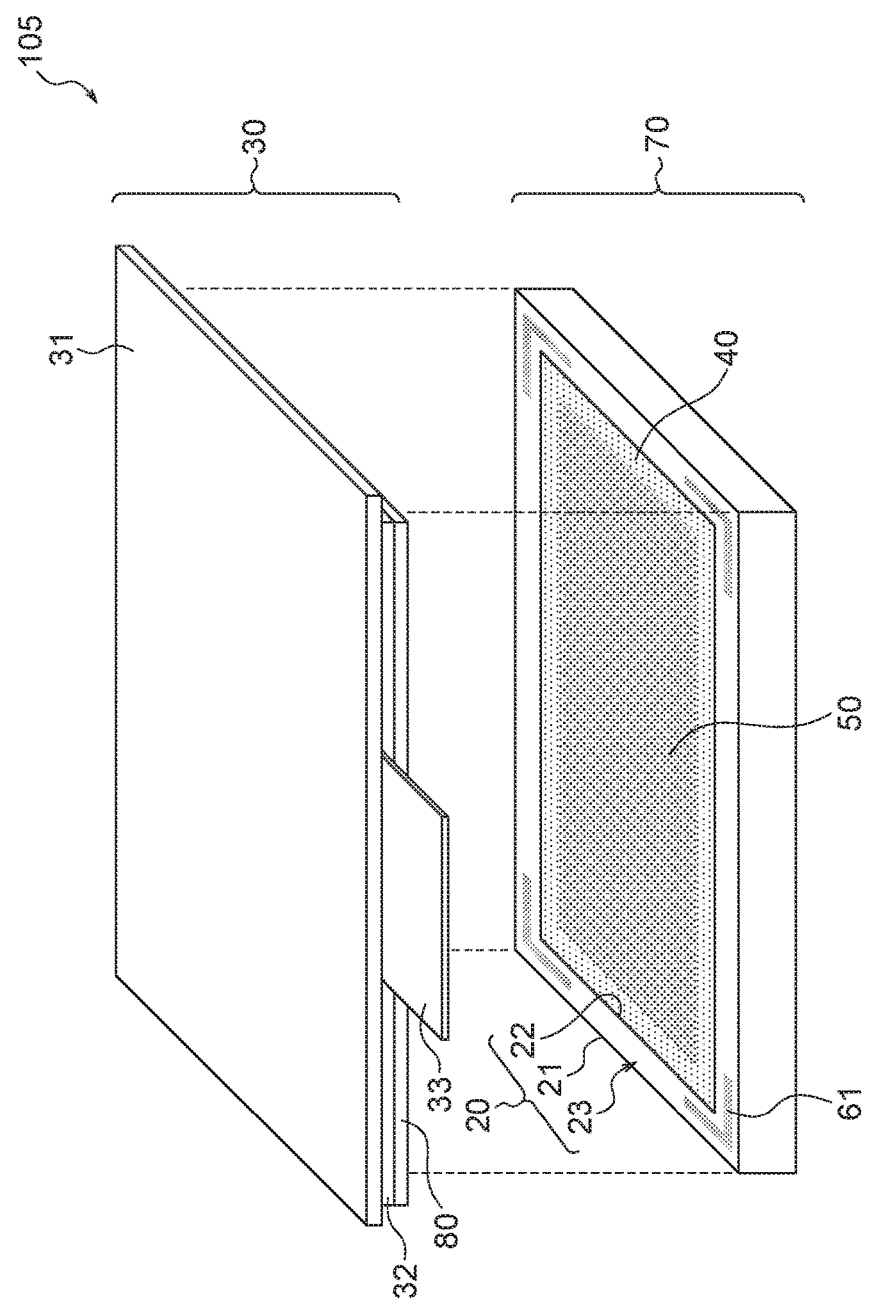
FIG. 11 is a detailed perspective view showing a display device according to a fifth exemplary embodiment.

Next, a display device according to a fifth exemplary embodiment will be described by referring to FIG. 11.

It is a feature of a display device 105 of the fifth exemplary embodiment that an adhesive member 61 is provided only in the four corners of the bezel 20 while the adhesive member 60 (FIG. 2) of the first exemplary embodiment is provided on the whole circumference of the bezel 20. The bezel 20 and the frontal panel 30 are in a square shape. That is, in the first to fourth exemplary embodiments, the adhesive member 61 provided to the outer circumference of the resin member 40 can also be formed only in a specific part without surrounding the whole circumference of the resin member 40. For example, in the fifth exemplary embodiment, the adhesive member 61 is disposed in an L-letter shape only in the four corners of the bezel 20 in a part to be laminated with the frontal panel 30 in the display device of the first exemplary embodiment. The adhesive member 61 is disposed in order to reinforce the adhesive force of the OCR 50 since the fifth exemplary embodiment employs optical-bonding. Thus, the four corner parts of the bezel 20 where the external stress is applied heavily are reinforced in particular. The fifth exemplary embodiment can provide the effect that is as good as the effect acquired by disposing the adhesive member on the entire circumference as a function of reinforcing the adhesiveness. Thus, it is unnecessary to use extra materials, which can contribute to lowering the cost. The fifth exemplary embodiment can also be applied to the second to fourth exemplary embodiments. Other structures, operations, and effects of the fifth exemplary embodiment are the same as those of the first exemplary embodiment and the like.

Figure 12:
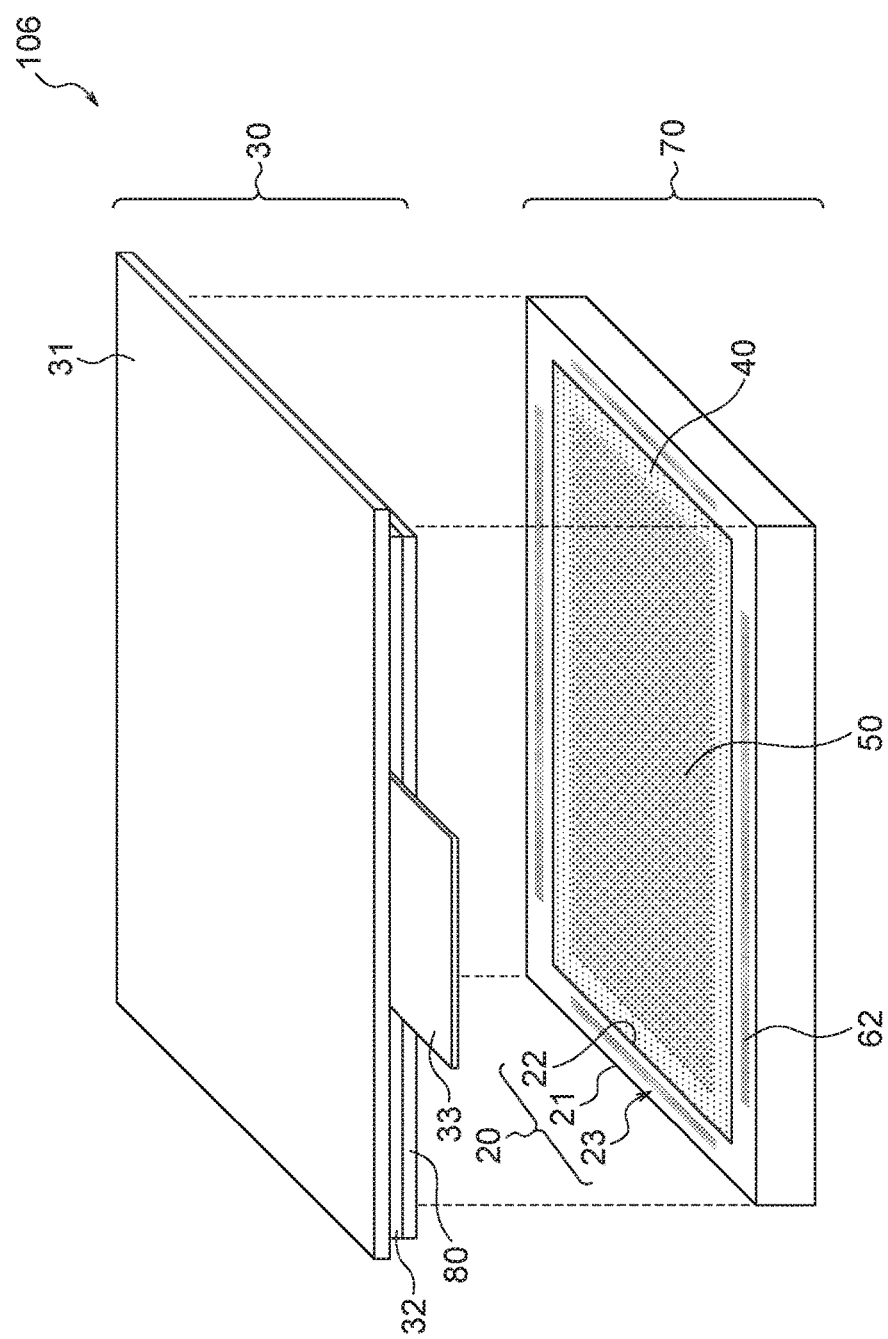
FIG. 12 is a detailed perspective view showing a display device according to a sixth exemplary embodiment.

Next, a display device according to a sixth exemplary embodiment will be described by referring to FIG. 12.

It is a feature of a display device 106 of the sixth exemplary embodiment that an adhesive member 62 is provided only in the four sides except for the four corners of the bezel 20 while the adhesive member 60 (FIG. 2) of the first exemplary embodiment is provided on the whole circumference of the bezel 20. That is, inversely from the case of the fifth exemplary embodiment, the sixth exemplary embodiment employs a structure with which the adhesive member 62 is not disposed only in the four corner parts of the bezel 20 in the display device of the first exemplary embodiment. In the first exemplary embodiment, the applied amount of the adhesive at the drawing bent points of the four corner parts of the bezel 20 tends to be large, so that the four corners of the bezel 20 are likely to be protruded up as a result. Thus, the pressure force applied when operating the frontal panel 30 transmits to the display panel 10 via the protruded part, so that ripple-like unevenness is likely to appear on the display face. In the meantime, if the stress applied on the laminating surface of the OCR 50 is not concentrated on the four corner parts of the bezel 20, exfoliation of the display panel 10 and the frontal panel 30 can be suppressed. So, it is enough to be configured to receive the stress by the circumference except for the four corners. Thus, with the sixth exemplary embodiment, it is possible to reinforce adhesiveness while suppressing generation of the ripple-like unevenness by not having the stress concentrated at the four corners of the bezel 20. The sixth exemplary embodiment can be applied also to the second to fourth exemplary embodiments. Other structures, operations, and effects of the sixth exemplary embodiment are the same as those of the first exemplary embodiment and the like.

Figure 13:
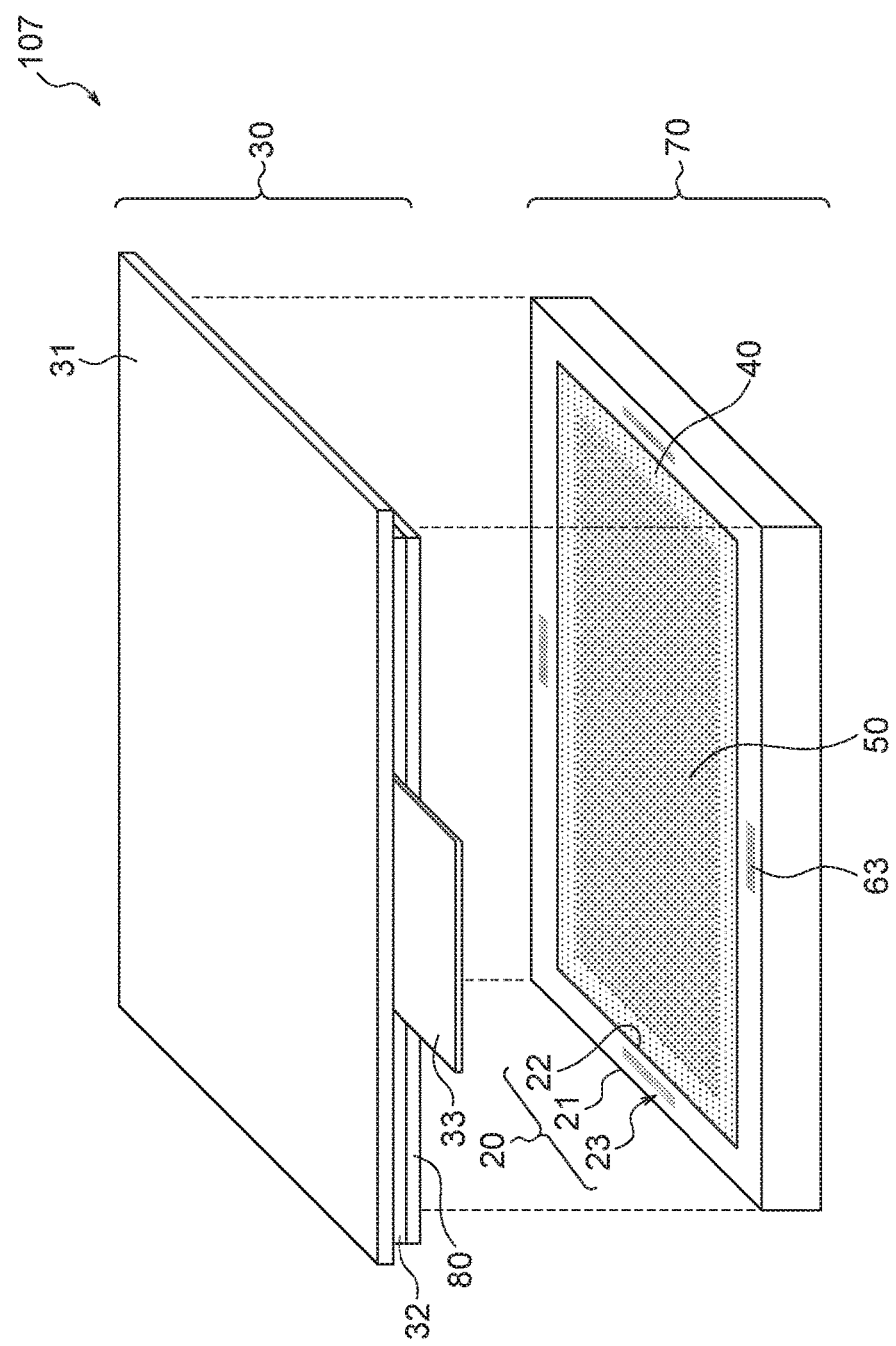
FIG. 13 is a detailed perspective view showing a display device according to a seventh exemplary embodiment.

Next, a display device according to a seventh exemplary embodiment will be described by referring to FIG. 13.

It is a feature of a display device 107 of the seventh exemplary embodiment that an adhesive member 63 is provided only each center of the four sides of the bezel 20 while the adhesive member 60 (FIG. 2) of the first exemplary embodiment is provided on the whole circumference of the bezel 20. That is, with the seventh exemplary embodiment, the UV-curable type adhesive member 63 is disposed only in substantially the vicinity of the center of each side of the display module 70 and UV light for tentatively fixing is irradiated from the side face direction (see a UV light source 95 and a UV light source 96 in FIG. 14). In the optical-bonding steps, it is desirable to fully cure the adhesive by irradiating UV light simultaneously with lamination. However, vacuum air bubbles are generated immediately after the lamination under a reduced pressure environment, so that it is left alone for a specific time without being fully cured until the air bubbles disappear. At that time, since the OCR 50 within the display face is uncured, it is necessary to tentatively fix the laminated frontal panel 30 and the display module 70 simultaneously with the lamination so that those are not shifted from each other. Normally, those are tentatively fixed by the surface viscosity of the resin member 40. In a case where more precise position alignment is required, position shift generated until the full curing is done can be prevented through applying the UV-curable type adhesive member 63 to substantially the center part of each side on the bezel 20 in advance and tentatively fixing them by irradiating UV light from the side face simultaneously with the lamination as in the case of the seventh exemplary embodiment. Other structures, operations, and effects of the seventh exemplary embodiment are the same as those of the first exemplary embodiment and the like.

Figure 14:
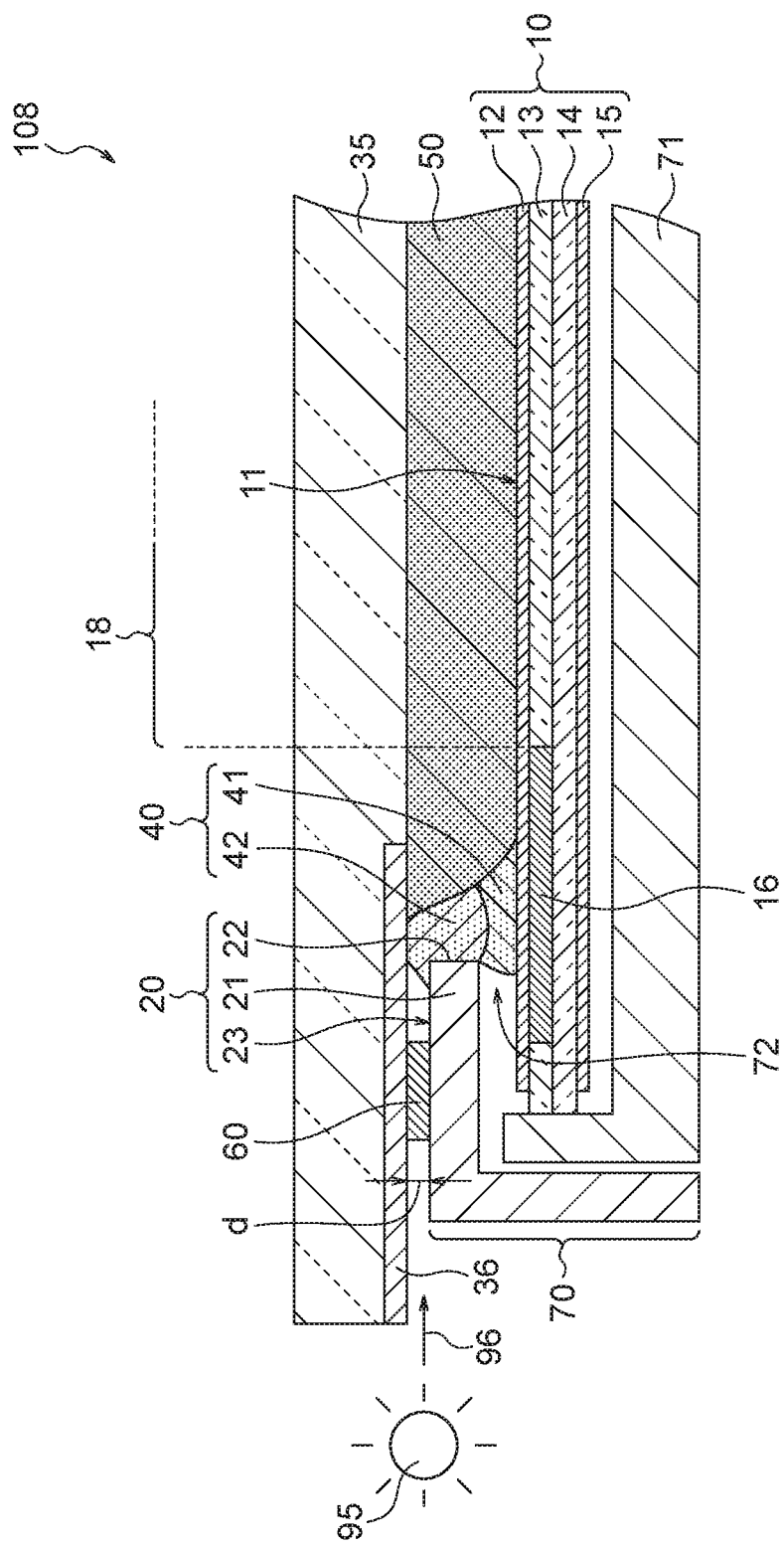
FIG. 14 is a fragmentary sectional view showing a display device according to an eighth exemplary embodiment.

Next, a display device according to an eighth exemplary embodiment will be described by referring to FIG. 14.

It is a feature of a display device 108 of the eighth exemplary embodiment that a frontal panel 35 is a decorated panel while the frontal panel 30 (FIG. 2) of the first exemplary embodiment is a touch panel. That is, in the eighth exemplary embodiment, the frontal panel 35 laminated with the display panel 10 via the whole surface thereof is not a touch panel but an decorated panel in which a decoration print 36 is applied on the outer circumference region thereof. The decoration print 36 is normally applied on the back face side of the frontal panel 35. In that case, when irradiating UV light from the side face, the UV light cannot reach the adhesive member 60 efficiently and curing fault may occur unless the distance d (=height of the resin member 40 with respect to the surface 23) from the surface of the decoration print 36 of the frontal panel 35 to the surface 23 of the bezel 20 is at least 100 μm or more and preferably 300 μm or more (see the UV light source 95 and the UV light source 96). However, by a spacer function of the resin member 40, the distance d can become sufficient for UV-curing the UV-curable type adhesive member 60, so that it is possible to achieve adhesive fixation securely even with optical-bonding of the frontal panel 35 alone. Note that all of the frontal panels in the first to seventh exemplary embodiments described above may also be decorated panels. Other structures, operations, and effects of the eighth exemplary embodiment are the same as those of the first exemplary embodiment and the like.

Figure 15:
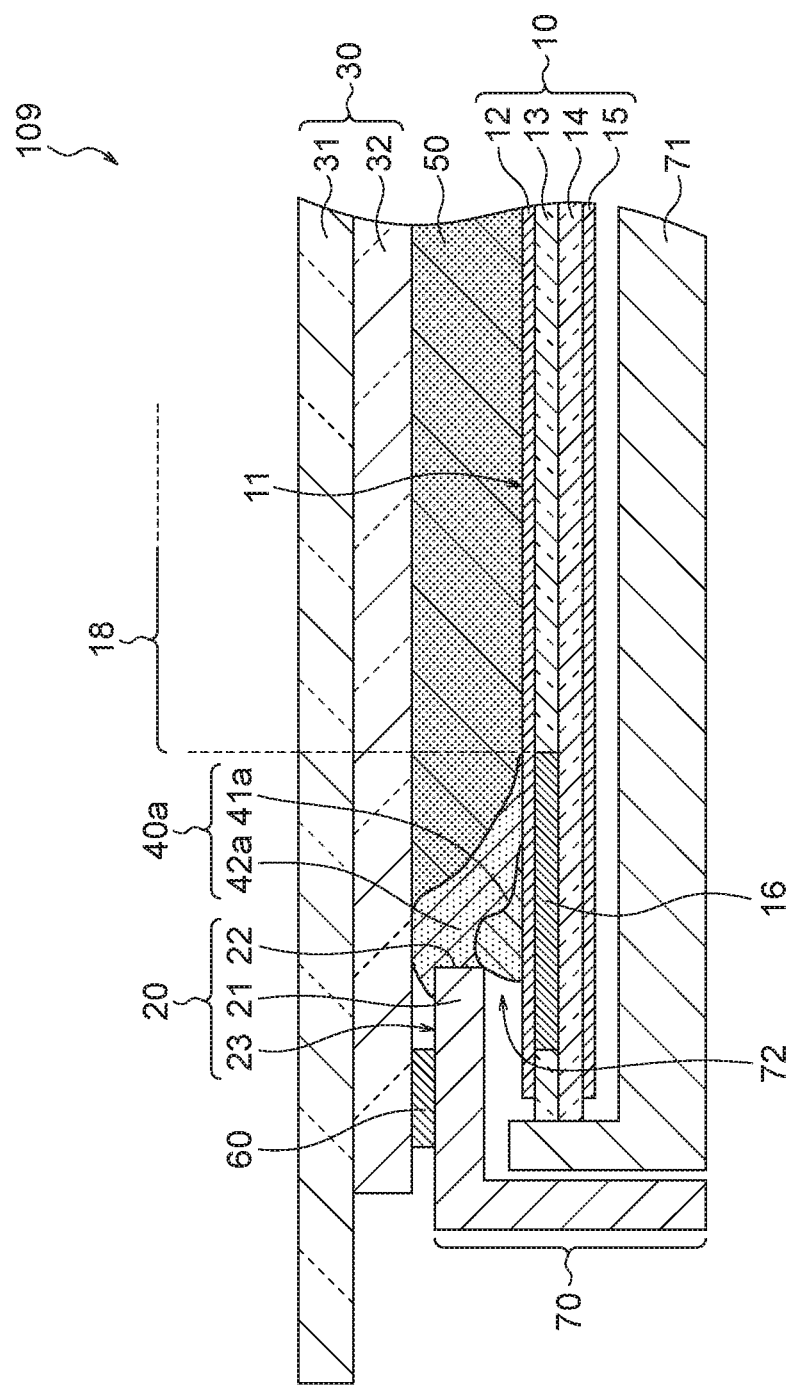
FIG. 15 is a fragmentary sectional view showing a display device according to a ninth exemplary embodiment.
Figure 18:
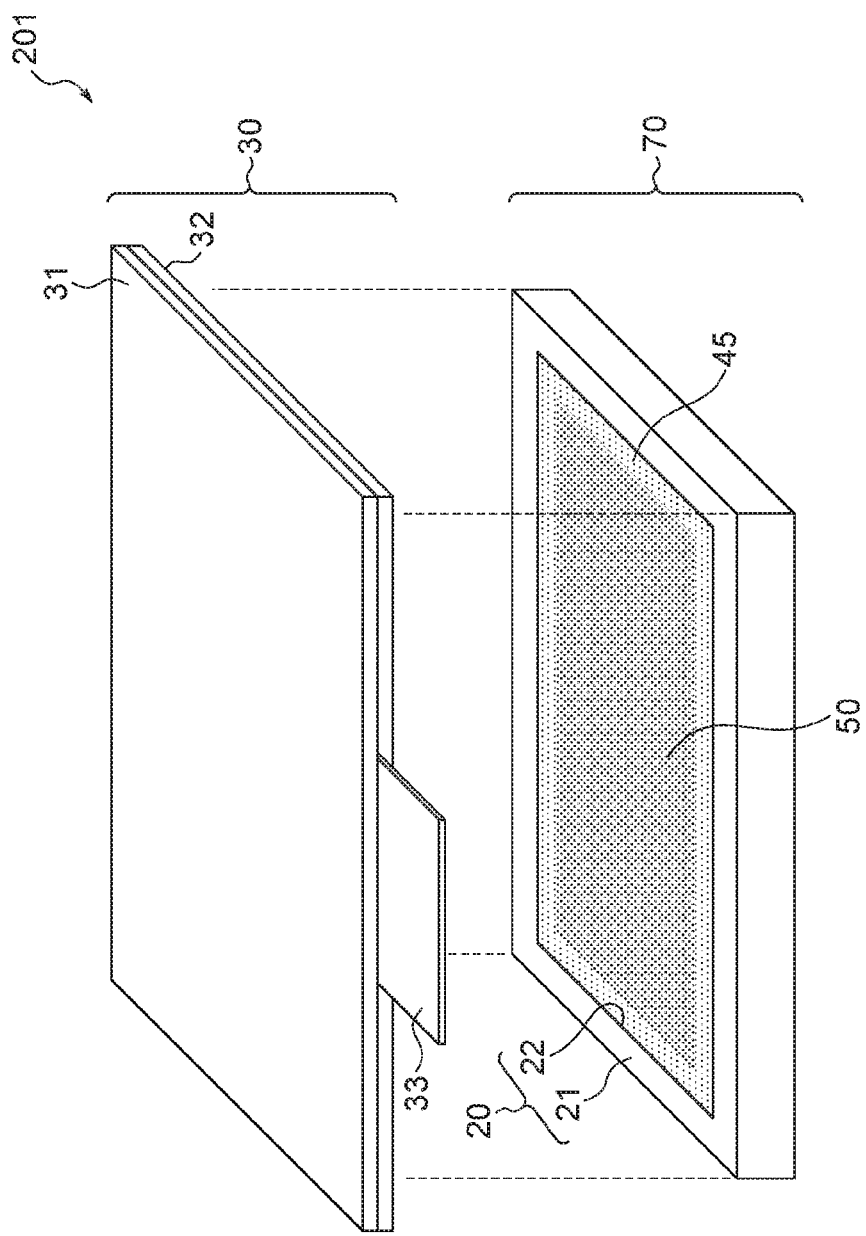
FIG. 18 is a detailed perspective view showing the display device according to the Related Technique 1.
Figure 19A:
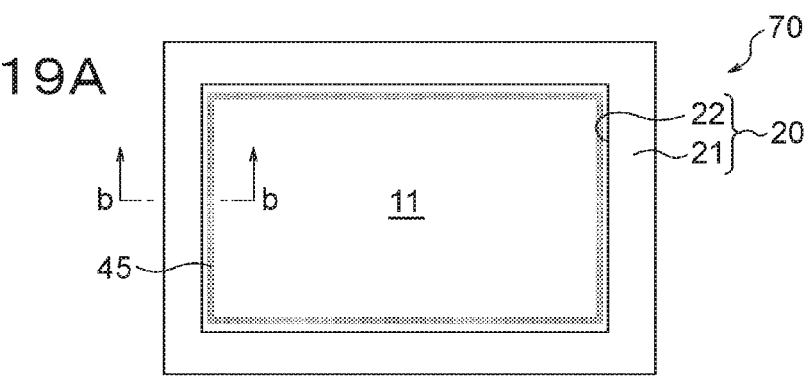
FIG. 19A is a plan view showing a state of the display module of the Related Technique 1 before OCR is applied.
Figure 19B:
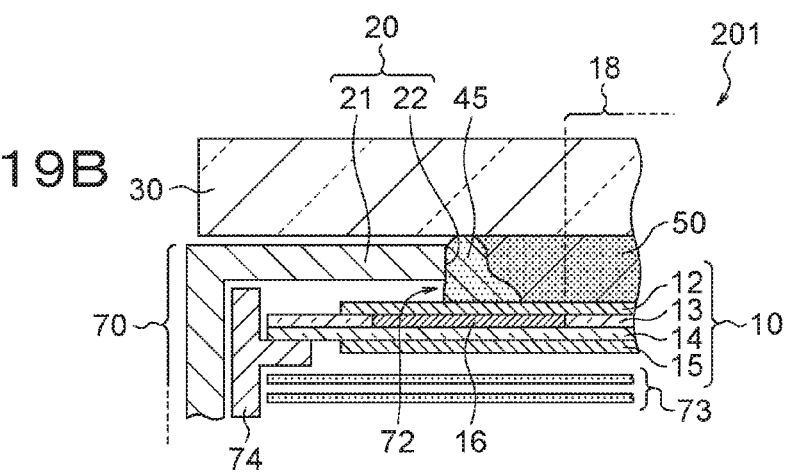
FIG. 19B is a sectional view of the display device (normal state) of the Related Technique 1 corresponding to a section taken along a line b-b of FIG. 19A.
Figure 19C:
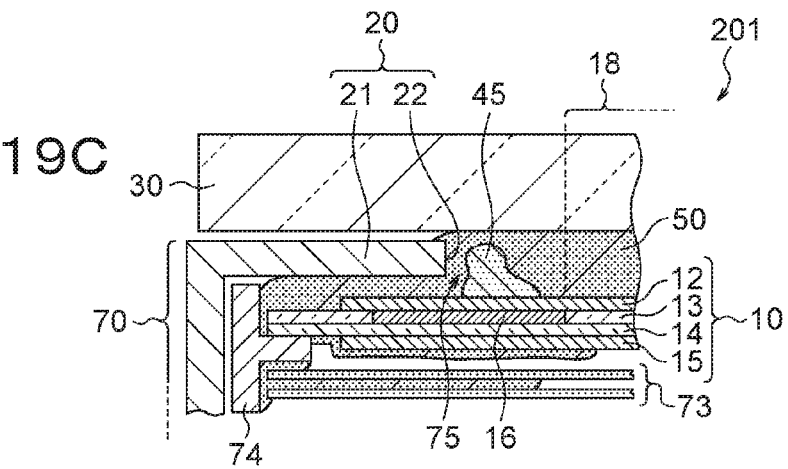
FIG. 19C is a sectional view of the display device (abnormal state) of the Related Technique 1 corresponding to a section taken along the line b-b of FIG. 19A.
Figure 22A:
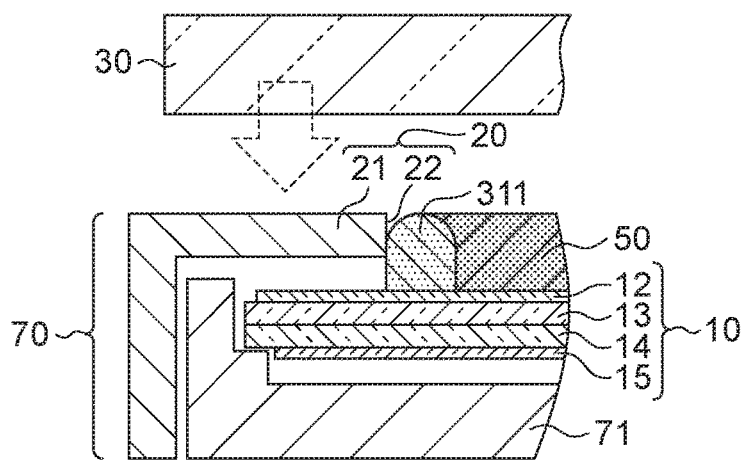
FIG. 22A to FIG. 22C are fragmentary sectional views showing defect generated when the Related Technique 2 is employed to a structure of the present invention, in which the steps are executed in order from FIG. 22A to FIG. 22C.
Figure 22B:
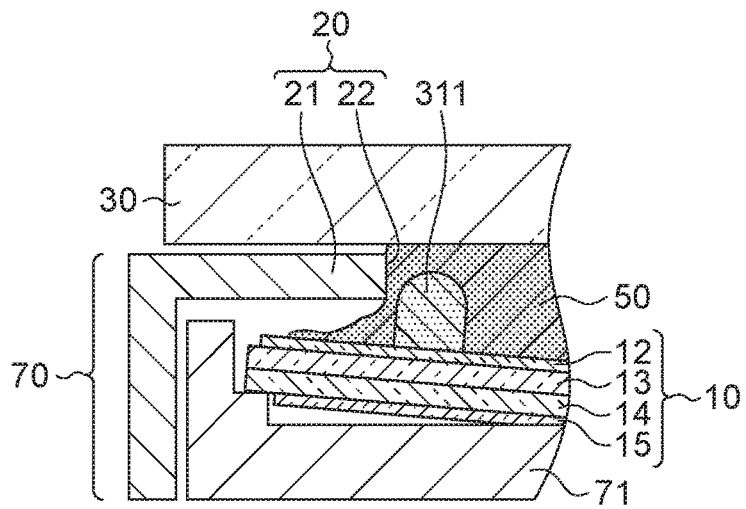
Figure 22C:
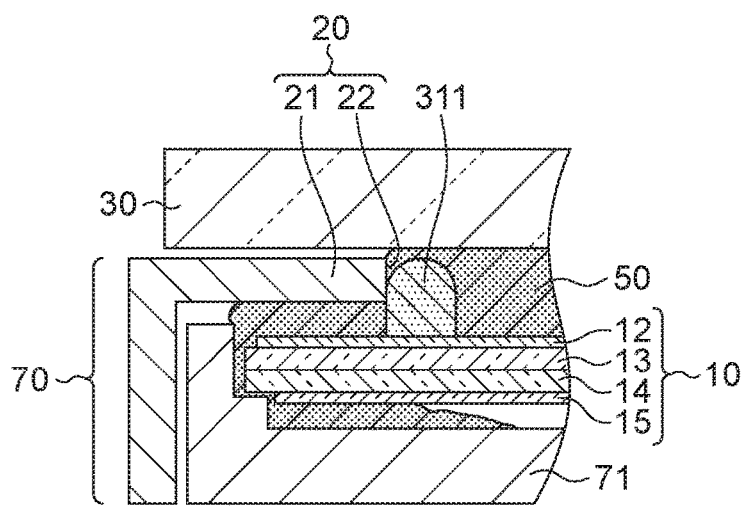

Next, a display device according to a ninth exemplary embodiment will be described by referring to FIG. 15.

It is a feature of a display device 109 of the ninth exemplary embodiment that a second resin member 42*a* reaches the display face 11 while the second resin member 42 (FIG. 1) of the first exemplary embodiment does not reach the display face 11. That is, in the ninth exemplary embodiment, the second resin member 42*a* that forms a resin member 40*a* is stacked on a first resin member 41*a* and makes contact with the forming face (the polarization plate 12 herein) of the first resin member 41*a*. Since a risk of generating display unevenness is increased, it is desirable for the end of the second resin member 42*a* not to be expanded to the display region 18. However, if it is within a range that does not affect the display state, the second resin member 42*a* can be formed by going over the range of the light-shielding film 16. Note that the structures of the ninth exemplary embodiment can be applied to all the other exemplary embodiments. Other structures, operations, and effects of the ninth exemplary embodiment are the same as those of the first exemplary embodiment and the like.

Next, a display device according to a tenth exemplary embodiment will be described by referring to FIG. 16A and FIG. 16B.

It is a feature of a display device 110 of the tenth exemplary embodiment that a second resin member 42*b* is formed only in a part of the whole circumference of the aperture end 22 while the second resin member 42 (FIG. 1) of the first exemplary embodiment is formed on the whole circumference of the aperture end 22. That is, the tenth exemplary embodiment is a case where: a first resin member 41*b* and the second resin member 42*b* (halfway-applied dam structure) are formed only in a part (e.g., a part where the gap 72 is maximum) of the bezel 20 (FIG. 16B); only the first resin member 41*b* (halfway-applied dam structure) is formed in the other part (FIG. 16A); and the frontal panel 30 is fixed by optical-bonding. The frontal panel 30 is smaller than the external shape of the display module 70 in the tenth exemplary embodiment, so that there is no adhesive member provided on the outer circumference of the resin member 40*b*. The tenth exemplary embodiment can be applied to cases where it is known in advance that the gap 72 between the bezel 20 and the display panel 10 becomes large, etc. That is, only the first resin member 41*b* is formed for the gap 72 that is in a level with which the halfway-applied dam structure can be formed stably only with the first resin member 41*b* (FIG. 16A), while the halfway-applied multi-layered dam structure constituted with the first resin member 41*b* and the second resin member 42*b* is formed only for the gap 72 that is in a level with which the halfway-applied dam structure cannot be formed stably only with the first resin member 41*b* (FIG. 16B). Thus, it is possible with the tenth exemplary embodiment to reduce the use amount of the dam agent, since the halfway-applied multilayered dam structure is not formed more than it is necessary. Further, tact time in manufacturing (dam drawing time) can be shortened, so that it is possible to provide low-cost display devices due to the improvement in the productivity. The halfway-applied multilayered dam may be employed partially for the entire circumference of the display module as in the case of the tenth exemplary embodiment. Other structures, operations, and effects of the tenth exemplary embodiment are the same as those of the first exemplary embodiment and the like.

While the present invention has been described by referring to each of the above exemplary embodiments, the present invention is not limited only to each of the above-described exemplary embodiments. Various kinds of changes and modifications occurred to those skilled in the art can be applied to the structures and details of the present invention. Further, the present invention also includes those acquired by combining a part of or a whole part of each of the above-described exemplary embodiments as appropriate.

For example, while the case of using the UV-curable type as OCR for laminating the whole surfaces has been described in each of the exemplary embodiments, same effects can be acquired also with the cases of using thermosetting type, moisture-curable type, a combination type of those, and the like. Further, while a case of two-layered structure has been described as the resin member of the multilayered structure, there is no problem generated even if structures of three layers or more are employed as long as the first resin member and the second resin member described above are included.

Furthermore, while the case where the frontal panel is in a square shape has been described, the shape is not essentially required to be in a square shape but may be in an arbitrary polygonal shapes, a flat shape having a curvature part, combinations of those, or may also be a stereoscopic shape. In such case, the first resin member is required to be formed on the entire circumference. However, the second resin member and the adhesive member are not necessarily required to be formed on the entire circumference.

Next, the present invention will be described from a different point of view.

The display device according to the present invention is a display device which includes a display module constituted with laminated upper and lower substrates (e.g., a liquid crystal display panel constituted with a CF substrate and a TFT substrate), a casing unit (e.g., a backlight unit) for housing the upper and lower substrates, and a bezel unit with a display unit being opened and mounted to the casing unit, wherein:

a frontal panel is laminated to the display unit of the display module, and a resin member (resin dam) is disposed at least along the entire circumference of the aperture of the bezel unit;

at least a part of the resin member is a multilayered structure stacked at least in two layers or more in which a first resin member (first dam) formed on the surface of the upper substrate and a second resin member (second dam) formed to cover over the first dam and the surface of the bezel; and an adhesive member is disposed in an external circumference region of the resin member of the multilayered structure as necessary.

The display device according to the present invention which includes a display module constituted with laminated upper and lower substrates, a casing unit for housing the upper and lower substrates, and a bezel unit with a display unit being opened and mounted to the casing unit, wherein:

a frontal panel is laminated to the display unit of the display module, and a resin member is disposed at least along the entire circumference of the aperture of the bezel unit; and the resin member is a multilayered structure stacked at least in two layers or more constituted with a first resin member formed on the surface of the upper substrate and a second resin member formed to cover over the first dam and the surface of the bezel.

Preferably, an adhesive member may be disposed on an external circumference region on the bezel of the resin member.

With the present invention, even with the display module where the size from the aperture end of the bezel to the display region is narrow or the variation in the gap between the bezel unit and the display panel is large, it is possible to securely form the narrow but thick resin member along the entire circumference of the aperture end of the bezel by applying it in two layers or more. Thus, the gap can be securely sealed without having the resin member covering over the display region. Therefore, by employing the present invention to the optical-bonding technique, leak of the OCR into the inside of the module can be securely prevented.

Further, in a case where the frontal panel is an electrostatic capacitive type touch panel, malfunctions occur due to the changes in the electrostatic capacitance caused by the noise from the display module and fluctuation in the gap with the metal-made bezel. Thus, it is necessary to laminate the display module and the touch panel sensor surface with a specific gap provided therebetween when laminating them. In the meantime, the resin member of the present invention has elasticity and is formed higher than the surface of the bezel, so that it can function as a spacer between the display module and the touch panel sensor surface. Therefore, with the present invention, it is unnecessary to provide the spacer individually and malfunctions can be prevented securely.

Further, through disposing the adhesive member in the outer circumference region of the resin member on the bezel, it is possible to reinforce the OCR adhesive surface in the display region and prevent exfoliation. In a case where the adhesive member is a resin exhibiting viscosity in an uncured state, the resin member functions as a spacer. Thus, even when the frontal panel is heavy, the adhesive member is not smashed excessively by the weight of the frontal panel and can be cured by keeping a certain shape and thickness. Thus, a secure adhesive force can be generated, and the adhesive member is not spread to the undesired region.

While a part of or a whole part of the above-described embodiments can be expressed as in following Supplementary Notes, it is to be noted that the present invention is not limited to the following structures.

(Supplementary Note 1) <<Highest Concept (all Exemplary Embodiments), Particularly Second Exemplary Embodiment>>

A display device which includes:
a display panel which includes a display face;
a bezel which includes a frame part and an aperture end on an inner side of the frame part, and covers a fringe of the display panel on the display face side with the frame part;
a resin member provided along a whole circumference of the aperture end of the bezel; and
a frontal panel provided on the display face side of the display panel in a state of sandwiching the bezel, wherein
the resin member includes a first resin member formed on the display face, and a second resin member formed to cover over the first resin member and at least a surface of the bezel opposing to the frontal panel.

(Supplementary Note 2) <<First Exemplary Embodiment>>

The display device as depicted in Supplementary Note 1, which further includes an optical elastic resin that is filled between the display face and the frontal panel.

(Supplementary Note 3) <<Ninth Exemplary Embodiment>>

The display device as depicted in Supplementary Note 1 or 2, wherein
the second resin member is formed to reach the display face further.

(Supplementary Note 4) <<Tenth Exemplary Embodiment>>

The display device as depicted in any one of Supplementary Notes 1 to 3, wherein
the second resin member is formed only in a part of the whole circumference of the aperture end.

(Supplementary Note 5) <<First to Ninth Exemplary Embodiments>>

The display device as depicted in any one of Supplementary Notes 1 to 4, which further includes an adhesive member which is provided on the surface of the bezel opposing to the frontal panel and on an outer circumference of the resin member, and adhesively fixes the bezel and the frontal panel.

(Supplementary Note 6) <<Fifth Exemplary Embodiment>>

The display device as depicted in Supplementary Note 5, wherein:
the bezel and the frontal panel are in a square shape; and
the adhesive member is provided only in four corners of the bezel.

(Supplementary Note 7) <<Sixth Exemplary Embodiment>>

The display device as depicted in Supplementary Note 5, wherein:
the bezel and the frontal panel are in a square shape; and
the adhesive member is provided in four sides of the bezel except for the four corners.

(Supplementary Note 8) <<Seventh Exemplary Embodiment>>

The display device as depicted in Supplementary Note 7, wherein
the adhesive member is provided only in each center of the four sides.

(Supplementary Note 9) <<Third and Fourth Exemplary Embodiments>>

The display device as depicted in any one of Supplementary Notes 5 to 8, which further includes a shield substrate which is provided on the surface of the frontal panel opposing to the display face and includes a surface where a transparent conductive film is formed, wherein
at least an uppermost resin member of the resin member or the adhesive member is formed with a conductive material, and the transparent conductive film and the bezel are electrically connected via the conductive material.

(Supplementary Note 10) <<Highest Concept (all Exemplary Embodiments), Particularly Second Exemplary Embodiment>>

A method for manufacturing a display device which includes a display panel including a display face, a bezel including a frame part and an aperture end on an inner side of the frame part, and a frontal panel, and the method includes:
a step of forming a first resin member by covering a fringe of the display panel on the display face side with the frame part of the bezel and applying a resin on the display face along a whole circumference of the aperture end of the bezel;
a step of forming a second resin member by applying a resin to cover over the first resin member and a surface of the bezel opposing to the frontal panel; and
a step of laminating the frontal panel to the display face side of the display panel where the first resin member and the second resin member are formed.

(Supplementary Note 11) <<First Exemplary Embodiment>>

The manufacturing method of the display device as depicted in Supplementary Note 10, which further includes, before the step of laminating the frontal panel to the display face side of the display panel, a step of applying an optical elastic resin on the display face that is surrounded by the first resin member and the second resin member.

(Supplementary Note 12) <<First to Ninth Exemplary Embodiments>>

The manufacturing method of the display device as depicted in Supplementary Note 10 or 11, which further includes, before the step of laminating the frontal panel to the display face side of the display panel, a step of applying an adhesive for adhesively fixing the bezel and the frontal panel in the surface of the bezel opposing to the frontal panel and outer circumference of the first resin member and the second resin member.

INDUSTRIAL APPLICABILITY

The present invention can be used not only for liquid crystal displays but broadly to various kinds of display fields such as organic EL displays, electronic paper displays, plasma displays, and the like.

What is claimed is:
1. A display device, comprising:
a display panel which includes a display face;
a bezel which includes a frame part and an aperture end on an inner side of the frame part, and covers a fringe of the display panel on the display face side with the frame part in a spaced relation with the fringe;
a resin member provided along a whole circumference of the aperture end of the bezel;
and
a frontal panel provided on the display face side of the display panel in a state of sandwiching the bezel, wherein
the resin member includes a first resin member formed on the display face, and a second resin member formed to cover over the first resin member and at least a surface of the bezel opposing the frontal panel and the resin member seals the spaced relation between the aperture end and the fringe of the display panel on the display face side.
2. The display device as claimed in claim 1, further comprising an optical elastic resin that is filled between the display face and the frontal panel.
3. The display device as claimed in claim 1, wherein the second resin member is formed to reach the display face further.
4. The display device as claimed in claim 1, wherein the second resin member is formed only in a part of the whole circumference of the aperture end.
5. The display device as claimed in claim 1, further comprising an adhesive member which is provided on the surface of the bezel opposing the frontal panel and on an outer circumference of the resin member, and adhesively fixes the bezel and the frontal panel.
6. The display device as claimed in claim 5, wherein:
the bezel and the frontal panel are in a square shape; and
the adhesive member is provided only in four corners of the bezel.
7. The display device as claimed in claim 5, wherein:
the bezel and the frontal panel are in a square shape; and
the adhesive member is provided in four sides of the bezel except for the four corners.

8. The display device as claimed in claim 7, wherein the adhesive member is provided only in each center of the four sides.

9. The display device as claimed in claim 5, further comprising a shield substrate which is provided on the surface of the frontal panel opposing the display face and includes a surface where a transparent conductive film is formed, wherein
at least an uppermost resin member of the resin member or the adhesive member is formed with a conductive material, and the transparent conductive film and the bezel are electrically connected via the conductive material.

10. A method for manufacturing a display device which comprises a display panel including a display face, a bezel including a frame part and an aperture end on an inner side of the frame part, and a frontal panel, the method comprising:
forming a resin member including a first resin member and a second resin member,
wherein the forming comprises:
forming the first resin member by covering a fringe of the display panel on the display face side with the frame part of the bezel in a spaced relation with the fringe and applying resin on the display face along a whole circumference of the aperture end of the bezel; and
forming the second resin member by applying a resin to cover over the first resin member and a surface of the bezel opposing the frontal panel,
wherein the resin member seals the spaced relation between the aperture end and the fringe of the display panel on the display face side; and
laminating the frontal panel to the display face side of the display panel where the first resin member and the second resin member are formed.

11. The manufacturing method of the display device as claimed in claim 10, further comprising, before laminating the frontal panel to the display face side of the display panel, applying an optical elastic resin on the display face that is surrounded by the first resin member and the second resin member.

12. The manufacturing method of the display device as claimed in claim 10, further comprising, before laminating the frontal panel to the display face side of the display panel, applying an adhesive for adhesively fixing the bezel and the frontal panel in the surface of the bezel opposing to the frontal panel and outer circumference of the first resin member and the second resin member.

13. The display device as claimed in claim 1, wherein the display panel further comprises a polarizing plate that includes the fringe of the display panel on the display face side that is covered by the bezel, and the resin member is formed on the polarizing plate.

14. The display device as claimed in claim 1, wherein the frame part comprises a bottom face that opposes the fringe on the display face side of the display panel, and wherein the spaced relation comprises a gap between the bottom face of the frame part and the fringe on the display face side of the display panel covered by the frame part.

* * * * *